(12) United States Patent  
Sato et al.

(10) Patent No.: US 9,041,827 B2  
(45) Date of Patent: *May 26, 2015

(54) SOLID-STATE IMAGE PICKUP DEVICE AND SIGNAL PROCESSING METHOD THEREFOR

(75) Inventors: Hiroki Sato, Kanagawa (JP); Keiji Mabuchi, Kanagawa (JP); Nobuo Nakamura, Kanagawa (JP); Tetsuya Iizuka, Kanagawa (JP)

(73) Assignee: Sony Corporation, Tokyo (JP)

( * ) Notice: Subject to any disclaimer, the term of this patent is extended or adjusted under 35 U.S.C. 154(b) by 2306 days.

This patent is subject to a terminal disclaimer.

(21) Appl. No.: 11/655,201

(22) Filed: Jan. 19, 2007

(65) Prior Publication Data

US 2007/0120990 A1     May 31, 2007

Related U.S. Application Data

(63) Continuation of application No. 10/449,125, filed on Jun. 2, 2003, now Pat. No. 7,227,570.

(30) Foreign Application Priority Data

Jun. 4, 2002   (JP) ............................... P2002-163134

(51) Int. Cl.
*H04N 5/228*     (2006.01)
*H04N 5/335*     (2011.01)
*H04N 3/14*      (2006.01)

(52) U.S. Cl.
CPC .................................... *H04N 5/335* (2013.01)

(58) Field of Classification Search
CPC .. H04N 5/335–5/378; H01L 27/148–27/14893
USPC ................... 348/332, 283; 341/155
See application file for complete search history.

(56) References Cited

U.S. PATENT DOCUMENTS 3,688,029 A * 8/1972 Bartoe et al. .................... 348/81
5,065,157 A * 11/1991 Ribner et al. .................. 341/143
(Continued)

FOREIGN PATENT DOCUMENTS

JP   05-218876   8/1993
JP   07-508150   9/1995
(Continued)

OTHER PUBLICATIONS

Japanese Office Action; Application No. 2002-163134; dated: Oct. 2, 2006.

*Primary Examiner* — Roberto Velez
*Assistant Examiner* — Pritham Prabhakher
(74) *Attorney, Agent, or Firm* — Fishman Stewart Yamaguchi PLLC

(57) ABSTRACT

The invention makes it possible to perform effective A/D conversion on pixel signals read from a pixel array part, to achieve a reduction in power consumption and reductions in the size and the price of an image pickup device as well as simplification of the construction of the device, and to realize a high-quality image output. The device includes an pixel array part having a plurality of unit pixels, a CDS (correlated double sampling) circuit, and an A/D converter. A pixel signal read from a pixel array part via a signal line is subjected to CDS processing (noise elimination processing) in the CDS circuit, and then this pixel signal is inputted into the A/D converter which performs A/D conversion on the pixel signal. The A/D converter includes a $\Delta\Sigma$ modulator and a digital filter to perform highly accurate A/D conversion. The invention can also be applied to a construction in which an A/D converter is provided at the front stage of the CDS circuit.

3 Claims, 23 Drawing Sheets

(56) References Cited

U.S. PATENT DOCUMENTS

| | | | |
|---|---|---|---|
| 5,248,971 A | 9/1993 | Mandl | |
| 5,448,609 A | 9/1995 | Couch et al. | |
| 6,021,172 A * | 2/2000 | Fossum et al. | 377/60 |
| 6,163,287 A * | 12/2000 | Huang | 341/143 |
| 6,169,506 B1 * | 1/2001 | Oprescu et al. | 341/143 |
| 6,330,051 B1 * | 12/2001 | Takanashi | 355/40 |
| 6,445,320 B1 * | 9/2002 | Noro et al. | 341/139 |
| 6,947,087 B2 * | 9/2005 | Egawa et al. | 348/304 |
| 2002/0075465 A1 * | 6/2002 | Nakamura et al. | 355/40 |

FOREIGN PATENT DOCUMENTS

| | | |
|---|---|---|
| JP | 07-508202 | 9/1995 |
| JP | 08-279755 | 10/1996 |
| JP | 09-083370 | 3/1997 |
| JP | 11-506579 | 6/1999 |
| JP | 2001-244814 | 9/2001 |
| JP | 2002-172113 | 6/2002 |
| JP | 2003-189186 | 7/2003 |
| WO | WO-99/33389 | 7/1999 |

* cited by examiner

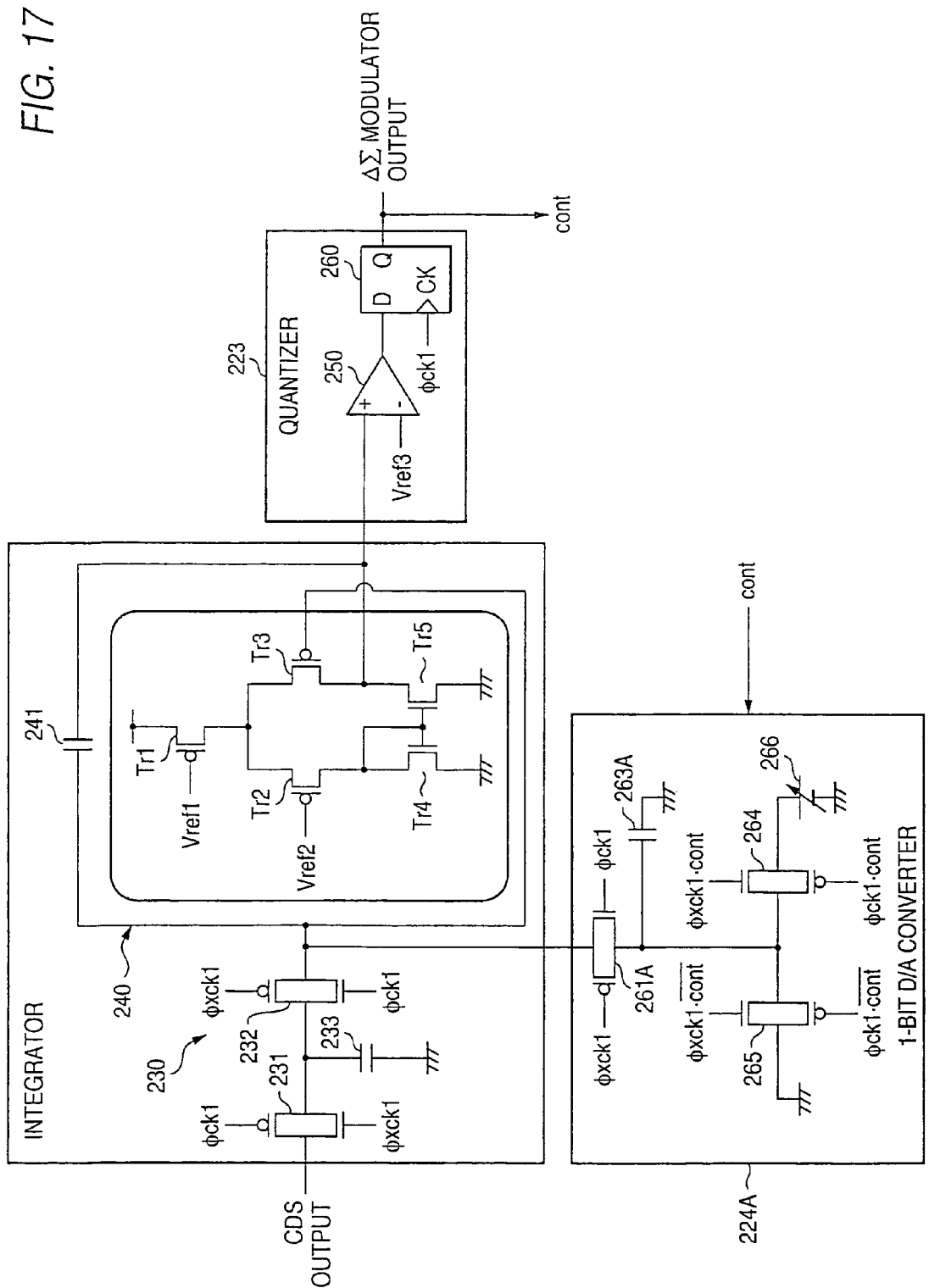

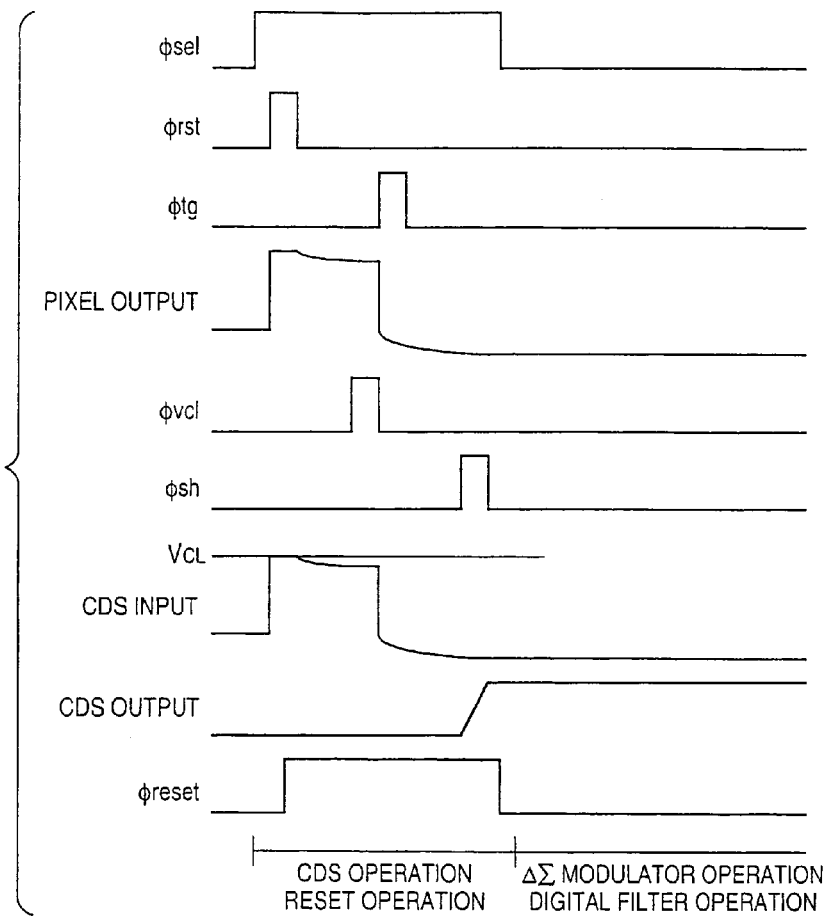
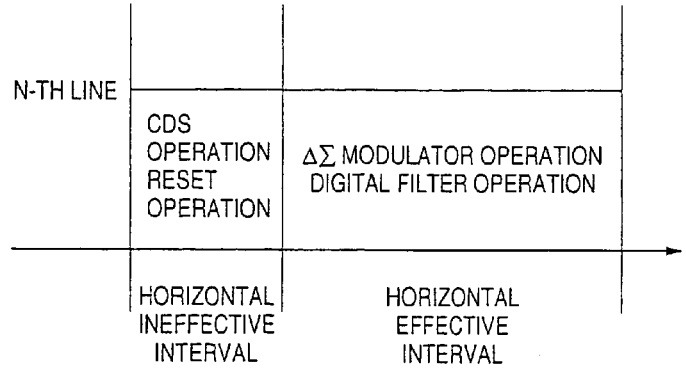

SOLID-STATE IMAGE PICKUP DEVICE AND SIGNAL PROCESSING METHOD THEREFOR

CROSS REFERENCE TO RELATED APPLICATIONS

The present application is a Continuation Application of the patent application Ser. No. 10/449,125, filed Jun. 2, 2003, which claims priority from Japanese Application 2002-163134 filed Jun. 4, 2002, the entire contents of which are incorporated herein by reference.

BACKGROUND OF THE INVENTION

1. Field of the Invention

The present invention relates to a solid-state image pickup device which performs A/D conversion on pixel signals generated in a pixel array part formed of a plurality of photoelectric conversion elements and outputs the obtained digital pixel signals, and more particularly, to a solid-state image pickup device including improved A/D converters for pixel signals, a signal processing method for such a solid-state image pickup device, and an electronic apparatus or electronic equipment including such a solid-state image pickup device. The term "electronic apparatus or electronic equipment" indicates, for example, a digital camera, a mobile telephone with a camera, or a personal computer, and the term "solid-state image pickup device" indicates an image pickup chip for a CCD image pickup device or an amplification type image pickup device (CMOS sensor), or an electronic device module in which an image pickup chip is integrated with a lens or another chip for incorporation into electronic equipment.

2. Description of the Related Art

In a related-art solid-state image pickup device which picks up an image of a subject and outputs a digital image signal, an analog image signal acquired from a photoelectric conversion element needs to be converted into a digital signal by an A/D converter provided at a predetermined position in a transmission path.

Therefore, there are various methods such as a method of converting pixel signals into digital signals in a pixel array part by means of A/D converters each provided for a plurality of pixels within the pixel array part, a method which uses A/D converters provided in a signal processing part for performing various kinds of signal processing on pixel signals transmitted from a pixel array part, and converts the pixel signals into digital signals before or after the various kinds of signal processing, and a method of converting an analog video signal into a digital video signal by means of A/D converters provided at the output stage of the analog video signal finished by a signal processing part.

The method using A/D converters provided within a pixel array part is disadvantageous when a greater number of pixels are to be arranged within the pixel array part, because the construction of each pixel becomes complicated.

The method using A/D converters provided at the output stage of a video signal is disadvantageous in terms of power consumption or the like because a video signal needs to be A/D-converted serially at a high speed and all processes such as signal processing need to be performed in an analog manner.

From these points of view, the most useful method is the method of converting an analog signal into a digital signal by means of A/D converters provided in a signal processing part near a pixel array part and then finishing a video signal through digital processing.

In a construction which reads pixel signals from a two-dimensional pixel array part into a signal processing part, the pixel lines or pixel columns of the two-dimensional pixel array part are sequentially selected by the operation of a vertical scanning circuit or a horizontal scanning circuit which is generally provided in a side portion of the two-dimensional pixel array part, and pixel signals are transferred to the signal processing part in units of pixel lines or pixel columns.

A construction which reads pixel signals in units of pixel lines will be described below by way of example.

In this construction, a signal processing part is disposed along the last line of the two-dimensional pixel array part, and signal processing circuits are provided for the respective pixel columns of the signal processing part (one set of signal processing circuits may also be provided per a group of pixel columns).

Each of the signal processing circuits sequentially acquires pixel signals from each one of the pixel columns on the basis of selection of a pixel line by the vertical scanning circuit, and performs predetermined signal processing on these pixel signals.

Incidentally, even in the case where signal processing is performed in units of pixel lines, essentially the same operation is performed.

As the signal processing in each of the signal processing parts, it is general to perform, for example, amplification and CDS (correlated double sampling) processing on various pixel signals. There may be a case where current-voltage conversion or the like is also included.

In this signal processing part, A/D converters are respectively provided to correspond to pixel columns or pixel lines of the two-dimensional pixel array part, whereby digital pixel signals can be obtained by means of a comparatively simple and inexpensive construction by performing A/D conversion on pixel signals for each of the pixel columns or the pixel lines. In addition, since rear-stage processing can be performed with digital processing, this construction can contribute to a reduction in power consumption or the like.

SUMMARY OF THE INVENTION

Although various types of A/D converters to be used for the above-described A/D conversion have heretofore been provided, optimum A/D conversion is extremely difficult to perform, because of the above-described construction in which signal processing circuits each provided for each one of pixel columns or pixel lines perform A/D conversion on pixel signals.

A pulse integration type and a flash type are known as representative examples of related-art A/D converters.

The pulse integration type compares an analog input signal which is a conversion target, with a predetermined ramp waveform, counts the time taken to confirm the coincidence between both signal levels, by means of a counter, and outputs as a digital signal a count value corresponding to the level of the analog input signal.

However, this method is too slow in operation to be made higher in conversion accuracy, because the counting operation of the counter takes time, and the error of a comparator easily influences the error of a conversion result and a lower voltage construction is difficult to realize. For these reasons, the pulse integration type is not suited to A/D conversion to be incorporated into the above-described signal processing part.

The flash type divides an analog input signal which is a conversion target, into a plurality of steps by a resistance type potential dividing method, compares each of divided potential levels with each one of reference values, and detects a particular step and outputs the detected step as a digital signal.

However, although this method can realize high-speed conversion, a multiplicity of comparators need to be provided in each of A/D converters so as to realize higher conversion accuracy. For this reason, the flash type has the problem that its construction to be incorporated into the above-described signal processing part is extremely large in circuit scale and the structure of each element is extremely complicated.

The invention has been made in view of the above-described problems, and an object of the invention is to provide a solid-state image pickup device and a signal processing method therefor both of which are capable of performing effective A/D conversion on pixel signals read from pixels and make it possible to achieve a reduction in power consumption and reductions in the size and the price of an image pickup device as well as simplification of the construction of the device, and to realize a high-quality image output.

The invention is particularly advantageous when applied to an image pickup device having a construction in which signal processing circuits each provided for each one of pixel columns or pixel lines perform A/D conversion on pixel signals. However, the invention can also be applied to a construction in which A/D converters are provided with respect to a plurality of pixels in a pixel array part, or to a construction in which A/D converters are provided at the output stage of analog video signals finished by the signal processing part.

To achieve the above object, a solid-state image pickup device according to the invention includes:

a pixel array part in which a plurality of pixels each including a photoelectric conversion element are arrayed in a one-dimensional direction or in two-dimensional directions; and signal processing parts for performing predetermined signal processing on pixel signals outputted from the pixels, each of the signal processing parts having an A/D converter for converting an analog signal into a digital signal, the A/D converter including at least a modulator.

A signal processing method for a solid-state image pickup device according to the invention includes an A/D conversion step of converting an analog pixel signal outputted from a pixel into a digital pixel signal, the A/D conversion step using a modulator and a digital filter.

An electronic apparatus according to the invention includes a solid-state image pickup device, the solid-stage image pickup device including: a pixel array part in which a plurality of pixels each including a photoelectric conversion element are arrayed in a one-dimension direction or in two-dimensional directions; and signal processing parts for performing predetermined signal processing on pixel signals outputted from the pixels, each of the signal processing parts having an A/D converter for converting an analog signal into a digital signal, the A/D converter including at least a modulator.

According to the invention, modulators and digital filters are used for the A/D conversion of converting analog pixel signals outputted from pixels into digital pixel signals, whereby highly accurate and highly reliable A/D conversion on analog pixel signals is performed by making the most of the characteristics of the modulators.

BRIEF DESCRIPTION OF THE DRAWINGS

The invention will become more readily appreciated and understood from the following detailed description of preferred embodiments of the invention when taken in conjunction with the accompanying drawings, in which:

FIG. 17 is a block diagram showing an example of the construction of a $\Delta\Sigma$ modulator according to a fourth embodiment;

FIGS. 20A and 20B are timing charts of the outline of the reset operation of a solid-state image pickup device according to a sixth embodiment of the invention;

DETAILED DESCRIPTION OF THE INVENTION

Preferred embodiments of a solid-state image pickup device and a signal processing method therefor according to the invention will be described below.

Figure 1:
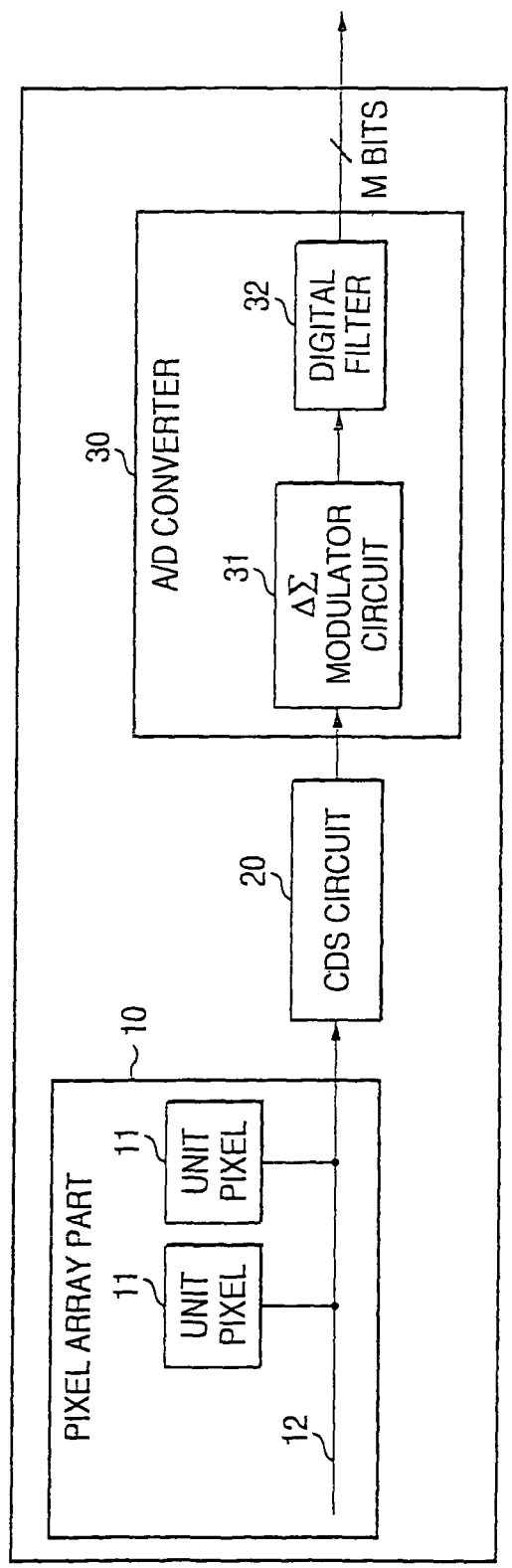
FIG. 1 is a block diagram showing the construction of an essential output portion of a solid-state image pickup device according to a first embodiment of the invention.
Figure 2:
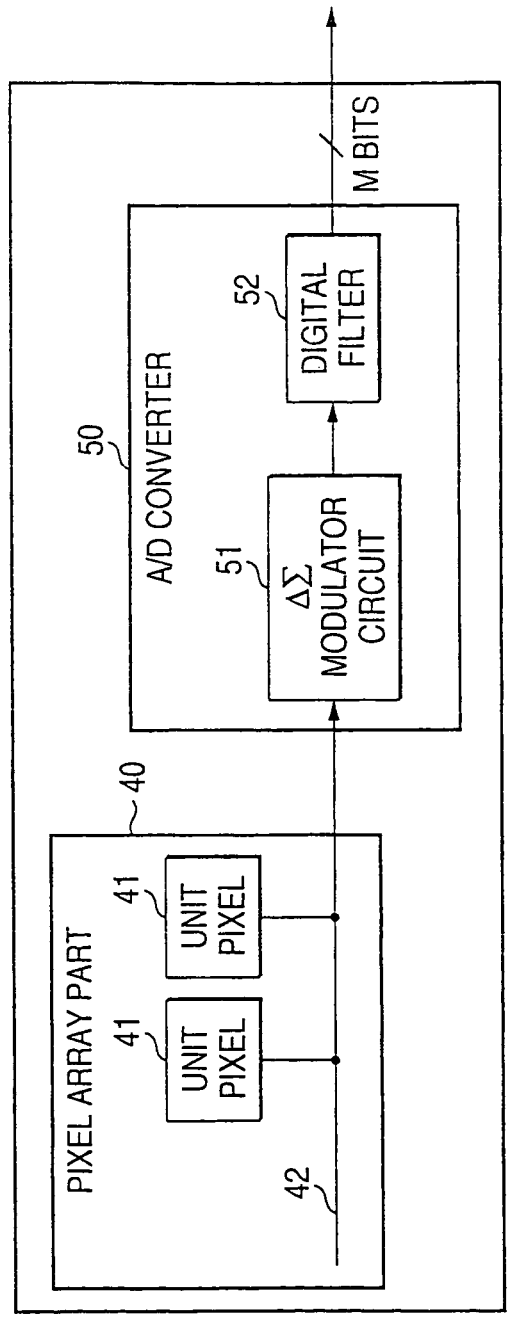
FIG. 2 is a block diagram showing the construction of an essential output portion of a solid-state image pickup device according to a second embodiment of the invention.

FIG. 1 is a block diagram showing an essential portion of a solid-state image pickup device according to a first embodiment of the invention. FIG. 2 is a block diagram showing an essential portion of a solid-state image pickup device according to a second embodiment of the invention.

First of all, the most basic characteristic point of each of the first and second embodiments will be schematically described below with reference to FIGS. 1 and 2.

FIG. 1 shows a pixel array part 10 including a plurality of unit pixels 11, a CDS (correlated double sampling) circuit 20, and an A/D converter 30. A pixel signal read from the pixel array part 10 via a signal line 12 is subjected to CDS processing (noise elimination processing) in the CDS circuit 20, and then the signal output from the CDS circuit 20 is inputted into the A/D converter 30 to perform A/D conversion on the pixel signal.

The basic characteristic portion of the first embodiment of the invention resides in the fact that the A/D converter 30 includes a ΔΣ modulator 31 and a digital filter 32.

FIG. 2 shows a pixel array part 40 including a plurality of unit pixels 41 and an A/D converter 50. A pixel signal read from the pixel array part 40 via a signal line 42 is inputted into the A/D converter 50 to perform A/D conversion on the pixel signal. A CDS circuit (not shown in FIG. 2) is provided at the rear stage of the A/D converter 50 so that CDS processing is performed on the pixel signal converted into a digital signal.

The basic characteristic portion of the second embodiment of the invention resides in the fact that the A/D converter 50 includes a ΔΣ modulator 51 and a digital filter 52.

The main difference between the constructions shown in FIGS. 1 and 2 is that the order of arrangement of the CDS circuit 20 and the A/D converter 30 is opposite to the order of arrangement of the CDS (not shown) and the A/D converter 50, and the A/D converters 30 and 50 which constitute part of the respective basic characteristic portions have a common construction.

FIG. 1 shows the construction of one of the pixel columns, and the pixel array part 10 is constructed to output pixel signals in the respective pixel columns via the corresponding signal lines, and the CDS circuit 20 and the A/D converter 30 are provided for each of the pixel columns and are constructed as part of a so-called column type of signal processing unit which performs signal processing on pixel signals in units of pixel columns.

In general, an A/D conversion method using a ΔΣ modulator is capable of realizing highly accurate conversion, but has the nature of being slow in processing speed. For this reason, in many related arts, the A/D conversion method using a ΔΣ modulator has been used not for A/D conversion of video signals but for A/D conversion of audio signals which are required to be of high quality.

In each of the first and second embodiments, ΔΣ modulators are used in a construction in which A/D conversion is performed on pixel signals in units of pixel columns, whereby the problem of conversion speed of each of the ΔΣ modulators is solved and the high-accuracy A/D conversion function thereof can be effectively utilized in the field of image processing.

A specific example of the first or second embodiment of the invention will be described below with illustrative reference to a construction corresponding to the above-described first embodiment shown in FIG. 1

Figure 3:
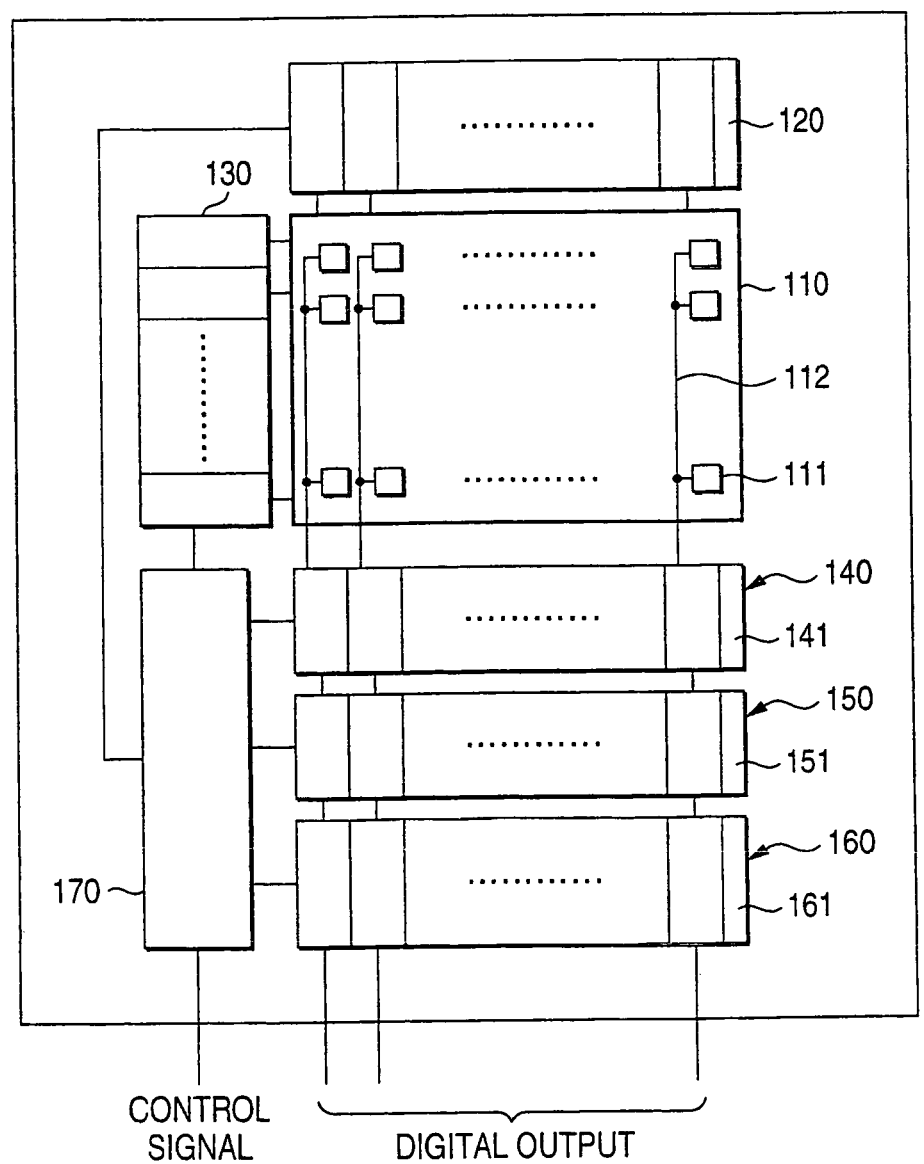
FIG. 3 is a schematic explanatory view showing the entire construction of an image array part and peripheral circuit parts of the solid-state image pickup device according to the embodiment shown in FIG. 1.

FIG. 3 is a schematic explanatory, view showing the entire construction of an image array part and peripheral circuit parts of the solid-state image pickup device according to the first embodiment.

An image array part 110 has a multiplicity of unit pixels 111 which are arrayed in a two-dimensional arrangement to constitute a square-shaped image pickup area. The construction of each of the unit pixels 111 will be described later.

A horizontal scanning circuit 120 is provided in the top side portion of the image array part 110 in such a manner as to extend along the pixel-line (horizontal) direction of the image array part 110, and a vertical scanning circuit 130 is provided in the left side portion of the image array part 110 in such a manner as to extend along the pixel-column (vertical) direction of the image array part 110. The unit pixels 111 in the image array part 110 are sequentially scanned by these scanning circuits 120 and 130, whereby the reading of pixel signals and an electronic shutter operation are executed.

It is to be noted that this example has a construction which scans the image array part 110 in the vertical direction in units of pixel lines and reads pixel signals from each pixel line via vertical signal lines 112 provided in the respective pixel columns.

A CDS part 140 in which a plurality of CDS circuits 141 are disposed to correspond to the respective pixel columns is provided at the rear stage (output side) of the image array part 110. Pixel signals of the respective pixel columns which are read from the image array part 110 via the corresponding vertical signal lines 112 are sequentially, inputted into the corresponding CDS circuits 141 of the CDS part 140, and the processing of eliminating noise peculiar to the unit pixels 111 by CDS is applied to the pixel signals.

Specifically, the respective unit pixels 111 of the image array part 110 contain peculiar characteristic errors due to MOS transistors or the like which constitute the respective unit pixels 111. Therefore, if the pixel signals read from the respective unit pixels are directly formed into a video signal, the non-uniformity of characteristics among the unit pixels 111 influences the video signal and appears as noise in an image.

To eliminate such characteristic errors among the unit pixels 111, the signal charges of the respective unit pixels 111 are temporarily reset and their reset levels are read, and after that, the unit pixels 111 are made to execute a light-receiving operation and their signal levels are read. The difference between the reset level and the signal level of each of the unit pixels 111 is found, and peculiar errors which occur in the respective unit pixels 111 at the time of resetting are cancelled by the errors of the signal levels of the respective unit pixels 111, thereby eliminating noise due to the nonuniformity of characteristics among the unit pixels 111.

A specific construction of each of the CDS circuits 141 will be described later.

A ΔΣ modulator part 150 in which a plurality of ΔΣ modulators 151 are disposed to correspond to the respective pixel columns is provided at the rear stage (output side) of the CDS part 140, and a digital filter part 160 in which a plurality of digital filters 161 are disposed to correspond to the respective pixel columns is provided at the rear stage (output side) of the ΔΣ modulator part 150.

Namely, the respective ΔΣ modulators 151 and the corresponding digital filters 161 constitute A/D converters corresponding to the respective pixel columns. Incidentally, all the A/D converters for the respective pixel columns are hereinafter collectively referred to as an A/D conversion part.

The respective ΔΣ modulators 151 receive pixel signals from the CDS circuits 141, and convert the waveforms of the pixel signals into binary signals. The respective digital filters 161 perform low-pass filter processing on the binary signals received from the ΔΣ modulators 151, and output the obtained signals to circuits (not shown) provided at the rear stages of the respective digital filters 161. In this manner, the analog pixel signals from the CDS part 140 are converted into digital pixel signals through the A/D conversion part.

The digital filter part 160 and the following area perform digital signal processing, and can be driven with a low source voltage compared to an analog signal processing area including the ΔΣ modulator part 150 and the previous area.

A specific construction of each of the ΔΣ modulators 151 and a specific construction of each of the digital filters 161 will be described later.

A timing generation circuit 170 generates various timing signals required for the operations of the respective parts 110 to 160, and supply the timing signals to the respective parts 110 to 160.

The parts 110 to 170 are provided on one semiconductor chip.

Incidentally, in the description of this example, reference is made to an example in which one of the CDS circuits 141 and one of the A/D converters are provided for each of the pixel columns, but the invention may also be applied to a construction in which one CDS circuit 141 and one set of A/D converter (one ΔΣ modulator 151 and digital filter 161) are provided for a plurality of pixel columns.

Figure 4:
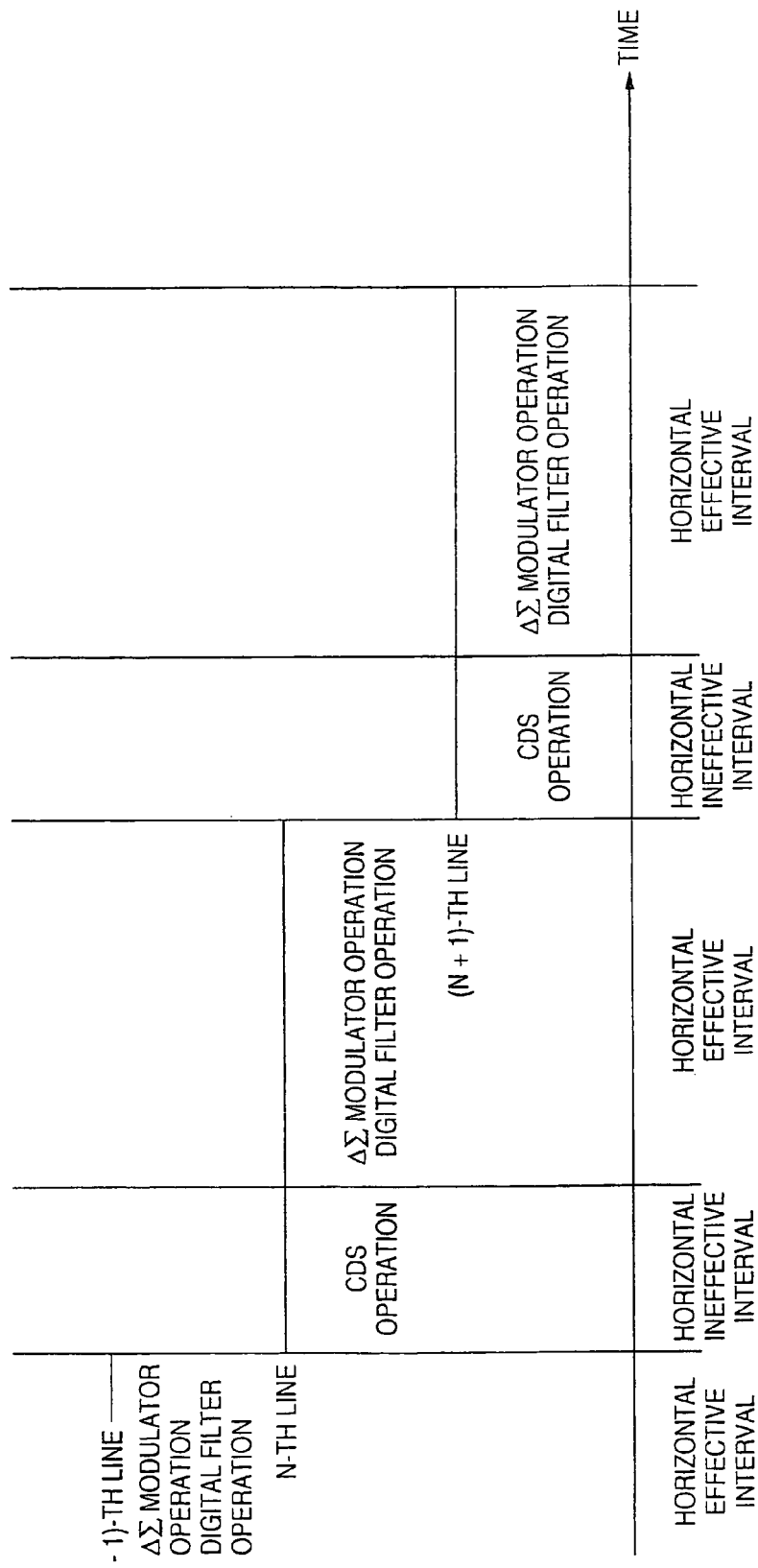
FIG. 4 is a timing chart showing the sequence of operations of a CDS part and an A/D conversion part in the embodiment shown in FIG. 1.

FIG. 4 is a timing chart showing the sequence of operations of the CDS part 140 and the A/D conversion part which are constructed in the above-described manner.

The operations of these parts are performed within one vertical scanning interval from the moment that pixel signals for one line are read from the image array part 110 until the moment that reading of the next line is started. In this example, during the horizontal effective interval in which each of the pixel columns is scanned by the horizontal scanning circuit 120, A/D conversion processing is performed with each one of the A/D converters (the ΔΣ modulators 151 and the digital filters 161), and during the retrace scanning interval (horizontal ineffective interval) of the horizontal scanning circuit 120, CDS processing is performed with the CDS circuits 141.

Namely, in the example shown in FIG. 4, after the processing of the previous line (the n-th line) has been completed, the CDS circuits 141 are operated to perform CDS processing on the next line (the (n+1)-th line) during the horizontal ineffective interval, and after that, during the horizontal effective interval, the ΔΣ modulators 151 and the digital filters 161 are sequentially operated to perform A/D conversion processing.

The specific construction and the operation of each of the above-described parts will be described below in due order.

The unit pixels 111 and the CDS circuits 141 in the above-described example will be described below.

Figure 5:
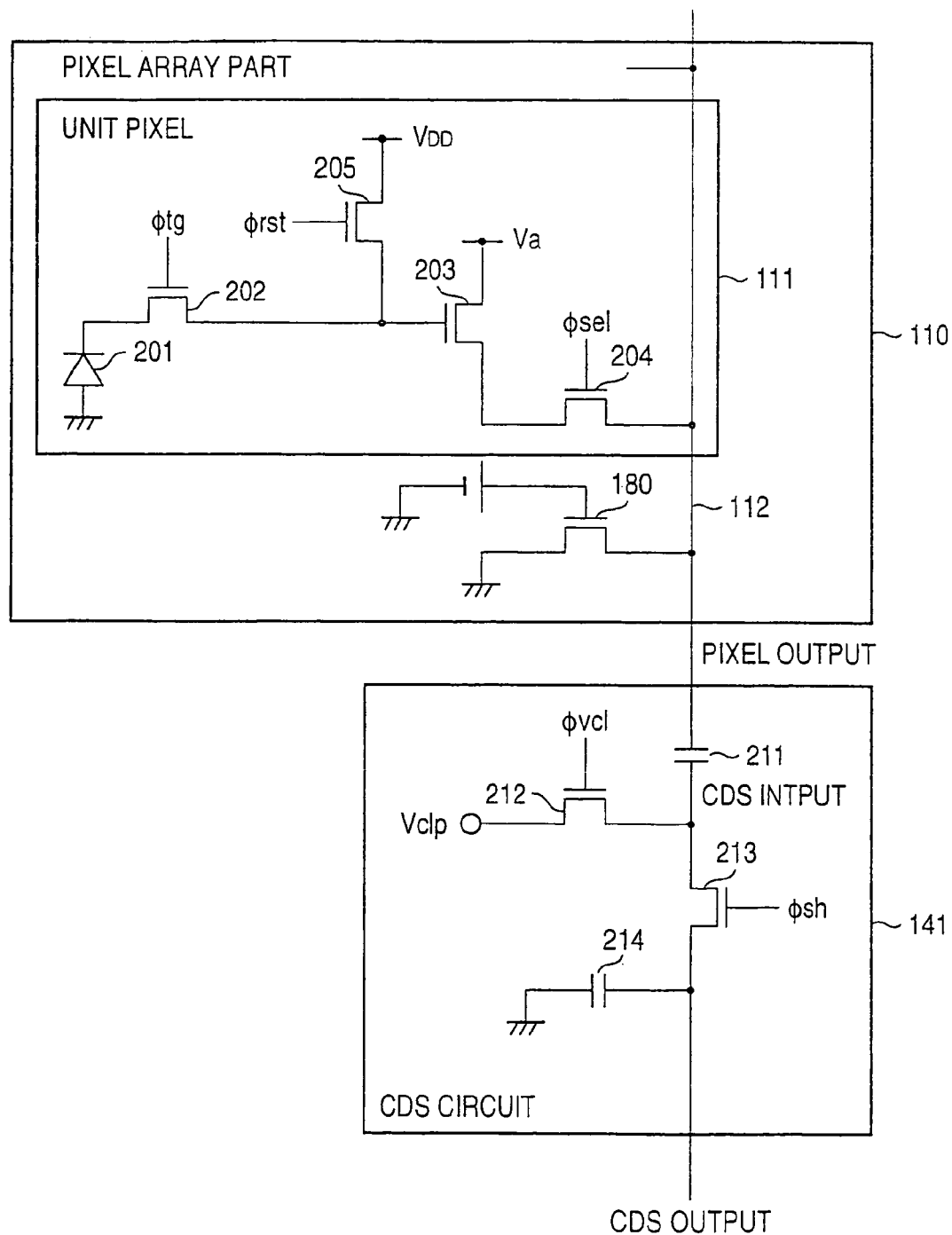
FIG. 5 is a circuit diagram showing an example of the construction of a unit pixel and a CDS circuit in the embodiment shown in FIG. 1.
Figure 6:
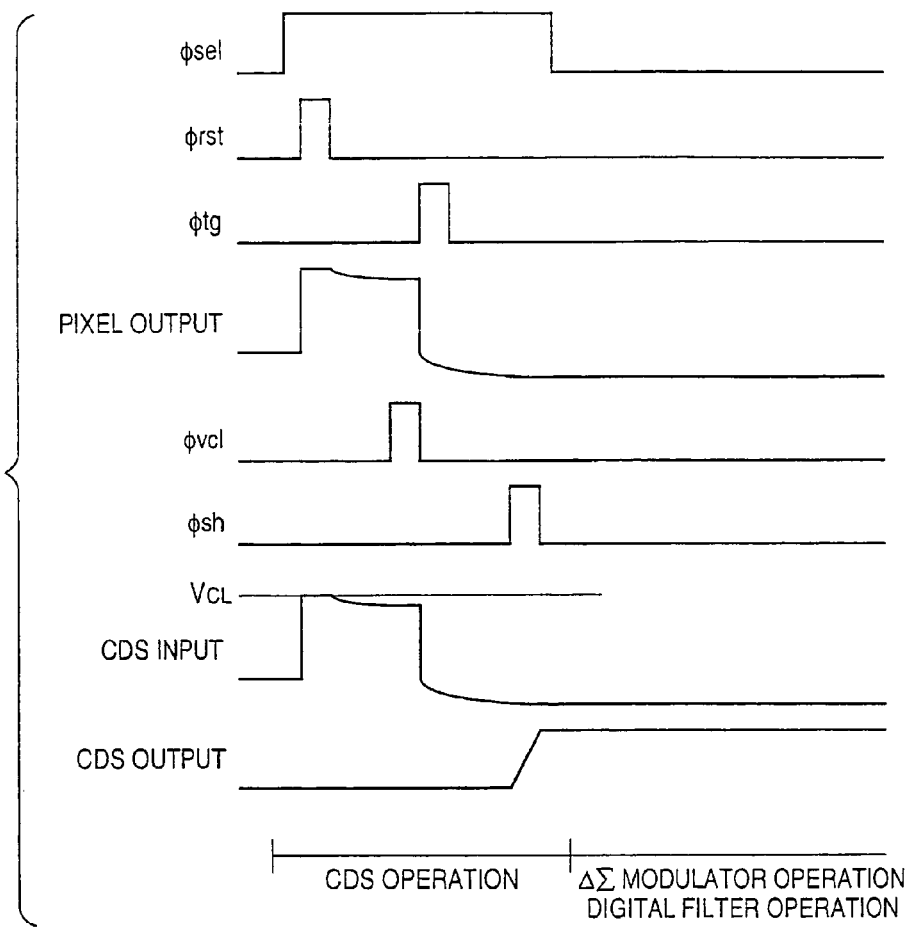
FIG. 6 is a timing chart showing the operation timing of each of the portions shown in FIG. 5.

FIG. 5 is a circuit diagram showing an example of the construction of one unit pixel 111 and one CDS circuit 141 in each of the first and second embodiments. FIG. 6 is a timing chart showing the operation timing of each of the portions shown in FIG. 5.

The shown unit pixel 111 has a photodiode 201 which serves as a photoelectric conversion element, a transfer transistor 202 which reads a signal charge generated by the photodiode 201, on the basis of a transfer pulse Φtg, an amplification transistor 203 which converts a variation in its gate potential due to the signal charge read by the transfer transistor 202 into an electrical signal, a selection transistor 204 which outputs the output of the amplification transistor 203 to the vertical signal line 112 on the basis of a line selection signal Φsel, and a reset transistor 205 which resets the signal charge of the photodiode 201 to a source voltage VDD on the basis of a reset pulse Φrst.

Incidentally, the unit pixel 111 is not limited to the construction of the above-described example using the four pixel transistors 202 to 205, and may have another construction.

Load transistors 180 which respectively convert current signals outputted from the unit pixels 111 to the corresponding vertical signal lines 112 into voltage signals are provided between the image array part 110 and the CDS part 140.

As shown in FIG. 5, the CDS circuit 141 which processes a pixel signal inputted through the load transistor 180 has a clamping capacitor 211, a clamping transistor 212, a sampling transistor 213, and a holding capacitor 214.

As described previously, general CDS processing finds the difference between the reset level and the signal level of each of the unit pixels 111, and needs to perform sampling on two levels, the reset level and the signal level, for each of the unit pixels 111. In the CDS circuit 141 of this example, the reset level of each of the unit pixels 111 is clamped to a fixed value common to all the unit pixels 111 by the clamping capacitor 211 and the clamping transistor 212, thereby forming a pixel signal from which noise due to the nonuniformity of characteristics among the unit pixels 111 has been eliminated through the sampling of only the signal level.

Namely, when the reset level is to be read from the unit pixel 111, the clamping transistor 212 is turned on by the clamping pulse Φvcl with the DC component of a pixel signal inputted from the vertical signal lines 112 cut off by the clamping capacitor 211.

Accordingly, a potential difference due to the reset level is produced on the input side (closer to the image array part 110) of the clamping capacitor 211, but the output side of the clamping capacitor 211 is held at a fixed value by a clamping voltage Vclp applied by the clamping transistor 212. At this point of time, the reset level becomes unnecessary to sample, because the fixed value is common to all unit pixels 111 owing to the clamping transistor 212.

Then, when the pixel signal is read from the unit pixel 111, the potential on the input side of the clamping capacitor 211 varies, and a variation appears on the output side of the clamping capacitor 211. At this point of time, the sampling transistor 213 is turned on by a sample-and-hold pulse Φsh, and the signal on the output side of the clamping capacitor 211 is inputted into the holding capacitor 214.

The operations of the unit pixel 111 and the CDS circuit 141 will be described below in brief with reference to FIG. 6.

First of all, when the unit pixel 111 is selected by the line selection pulse Φsel, the pixel signal is reset to the source voltage VDD by the reset pulse Φrst and a charge storage period is started.

Then, after a predetermined charge storage period, the signal charge of the unit pixel 111 is read by the transfer pulse Φtg, and the output of the unit pixel 111 is inverted.

In the meantime, immediately before the reading of the signal charge from the unit pixel 111, the input voltage of the CDS circuit 141 is clamped to the fixed value by the clamping voltage Vclp, and after the reading, the CDS circuit 141 detects the signal level by the sampling pulse Φsh.

Accordingly, pixel signal values uniform among all the unit pixels 111 can be obtained from the sampling of the signal levels without the need to sample the reset levels.

The A/D converters (the ΔΣ modulators 151 and the digital filters 161) of this example will be described below.

Figure 7:
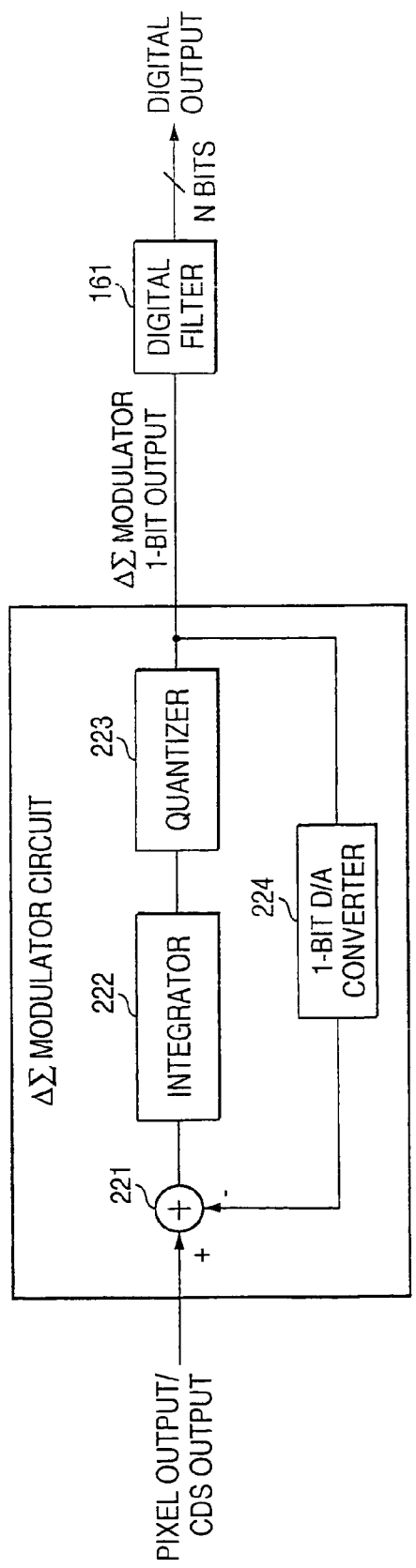
FIG. 7 is a block diagram showing the entire construction of a A/D converter in the embodiment shown in FIG. 1.
Figure 8:
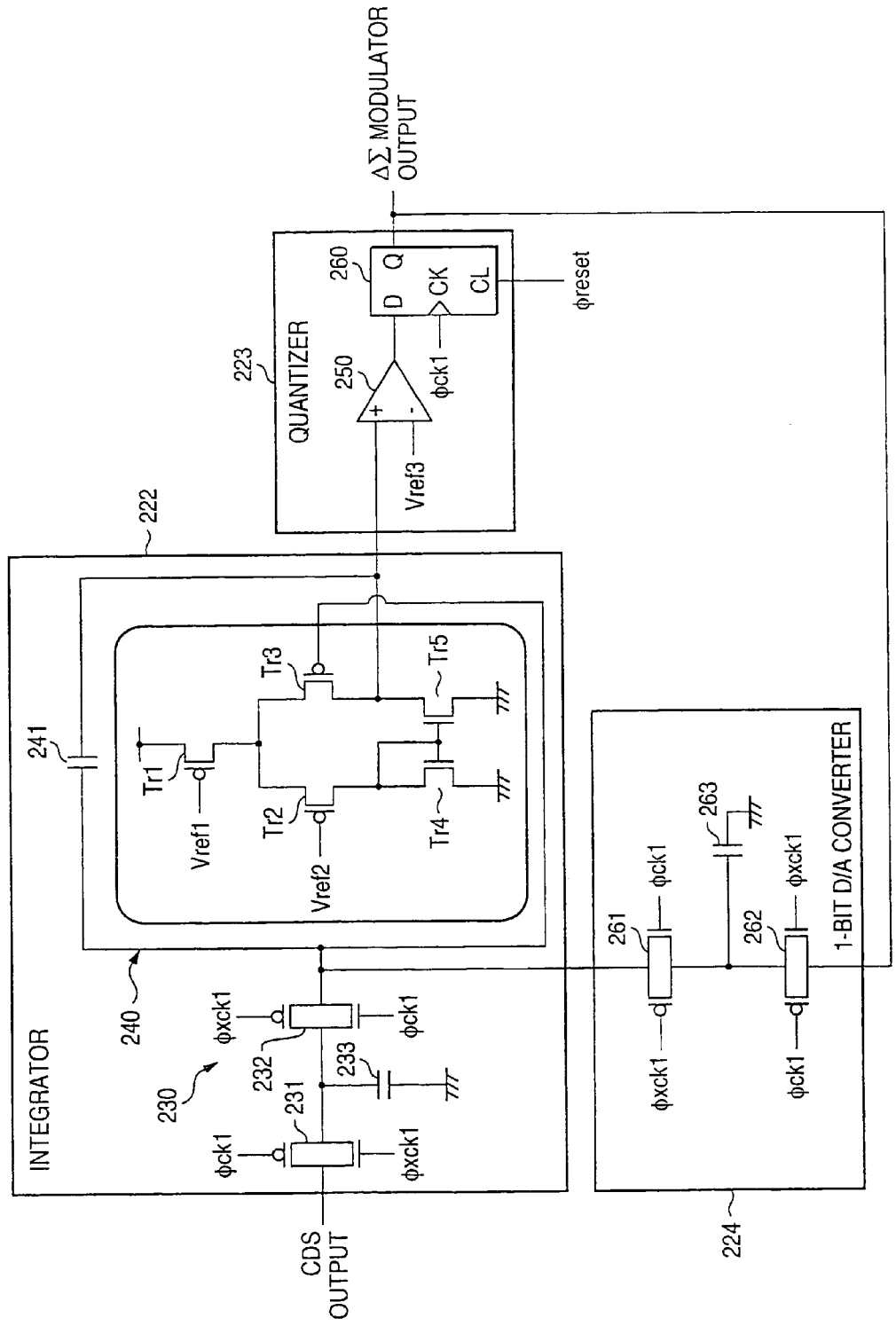
FIG. 8 is a block diagram showing an example of the construction of a $\Delta\Sigma$ modulator of the A/D converter shown in FIG. 7.

FIG. 7 is a block diagram showing the entire construction of one of the A/D converters of this example, and FIG. 8 is a block diagram showing an example of the construction of the ΔΣ modulator 151 of the A/D converter shown in FIG. 7.

Figure 9:
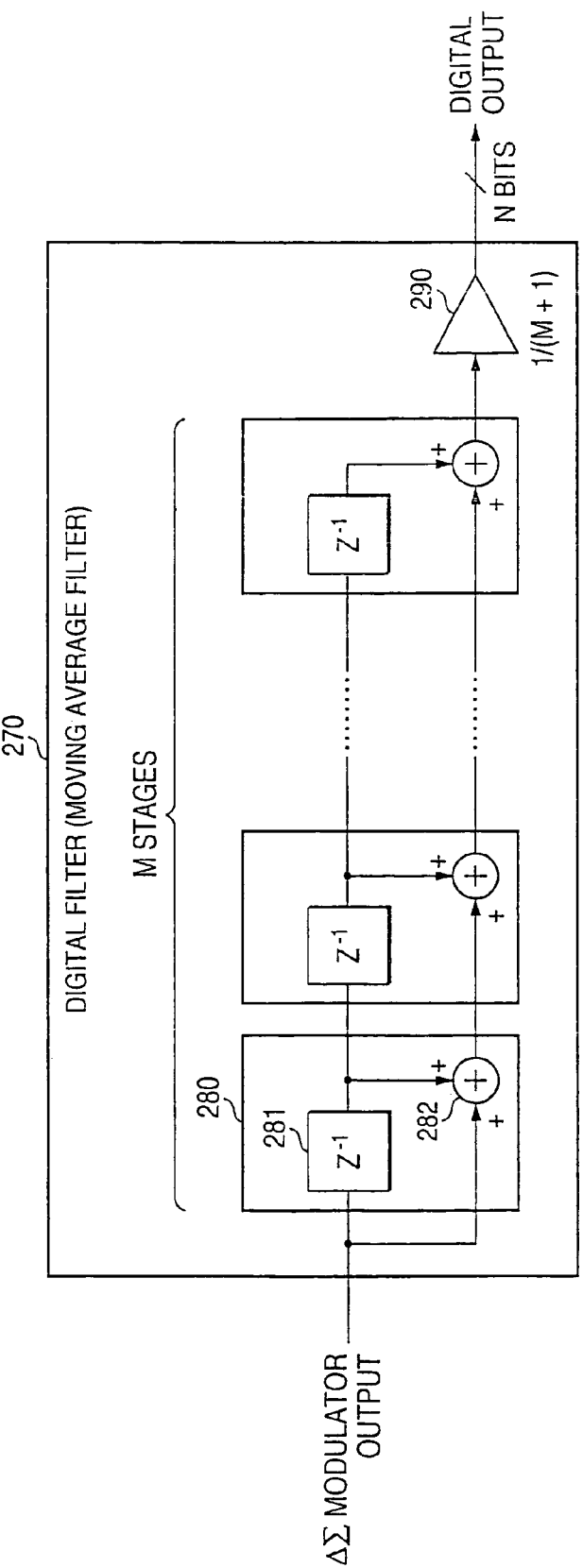
FIG. 9 is a block diagram showing an example of the construction of a digital filter of the A/D converter shown in FIG. 7.
Figure 10:
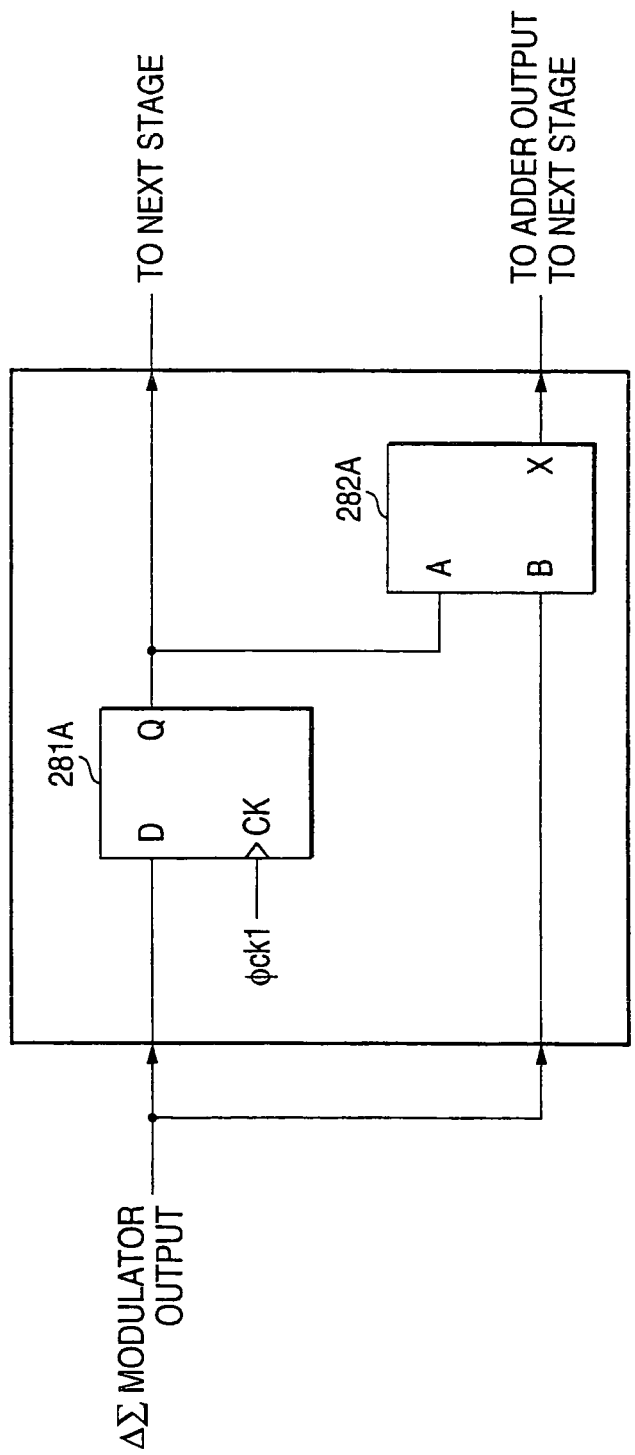
FIG. 10 is a block diagram showing an example of the construction of a moving average filter provided in the digital filter shown in FIG. 9.

FIG. 9 is a block diagram showing an example of the construction of the digital filter 161 of the A/D converter shown in FIG. 7, and FIG. 10 is a block diagram showing an example of the construction of a moving average filter provided in the digital filter 161 shown in FIG. 9.

Figure 11:
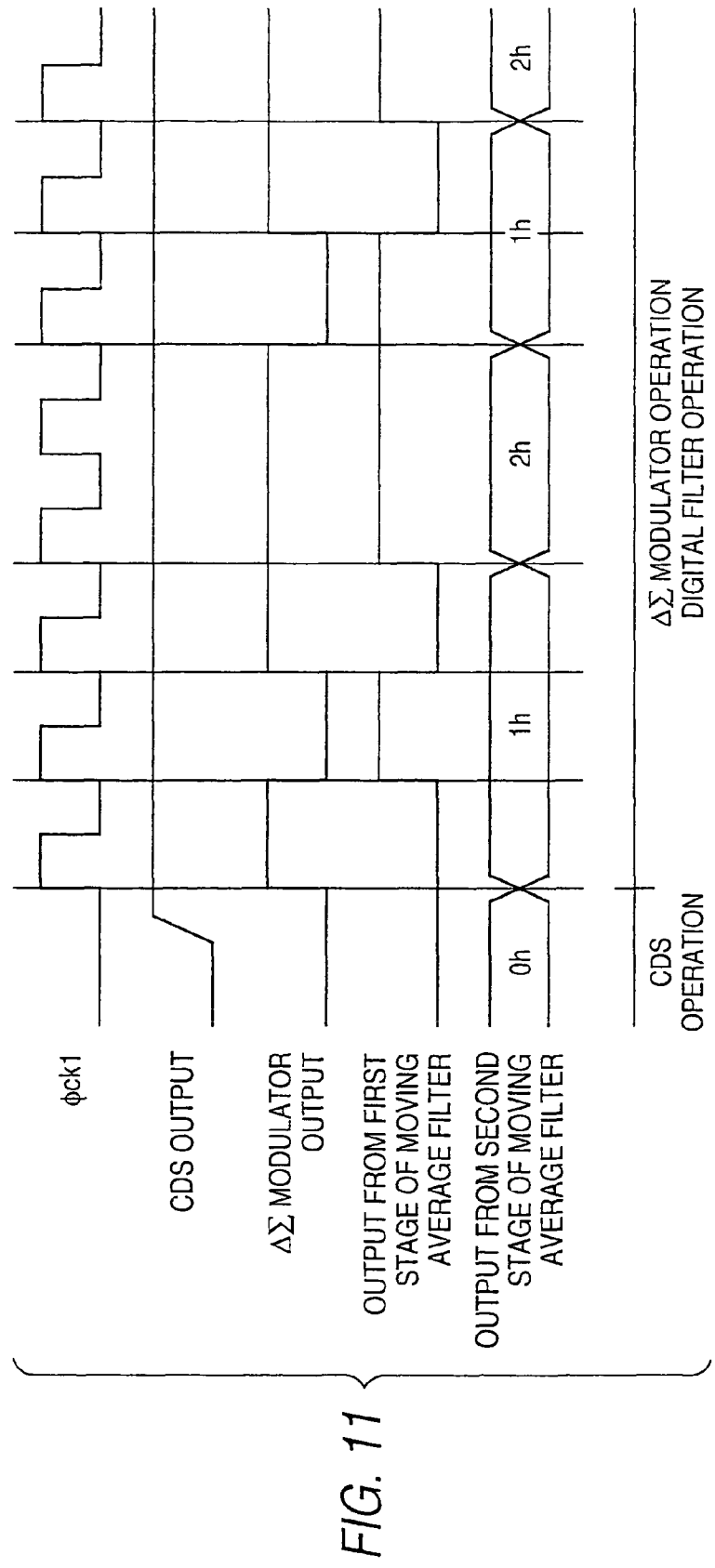
FIG. 11 is a timing chart showing the operation timing of the A/D converter shown in FIG. 7.

FIG. 11 is a timing chart showing the operation timing of the A/D converter shown in FIG. 7.

In the example shown in FIG. 7, the ΔΣ modulator 151 is made of a feedback circuit which includes an adder 221, an integrator 222, a quantizer 223 and a 1-bit D/A converter 224.

When an input signal from the above-described CDS circuit 141 (in the case where the CDS circuit 141 is not provided, a pixel signal from the unit pixel 111) is applied to the adder 221, the adder 221 finds the difference between the input signal and a feedback signal from the 1-bit D/A converter 224, and inputs the difference signal to the integrator 222. The integrator 222 integrates the input signal, and inputs the integral signal into the quantizer 223.

The quantizer 223 is constructed as a comparator which outputs "1" or "0" according to whether the input integral signal is not smaller than a predetermined value. The output from the quantizer 223 is inputted to the 1-bit D/A converter 224 through the feedback loop.

The 1-bit D/A converter 224 generates a predetermined analog signal according to whether the input from the quantizer 223 is "1" or "0", and outputs the predetermined analog signal to the adder 221. The adder 221 subtracts the output signal of the 1-bit D/A converter 224 from the input analog signal, and inputs the difference signal to the integrator 222.

The ΔΣ modulator 151 constructed in this manner outputs a binary signal of "1" or "0" (the output of the quantizer 223).

The digital filter 161 generates digital data of a certain number of bits by passing this compressional wave signal of "1" or "0" through low-pass filtering.

Incidentally, the example shown in FIG. 7 uses the ΔΣ modulator 151 including a linear feedback system formed of one integrator 222 and one 1-bit D/A converter 224, but it is also possible to use a quadratic or higher-degree ΔΣ modulator including an increased number of integrators 222 and an increased number of 1-bit D/A converters 224. By adopting a quadratic or higher-degree feedback system, it is possible to reduce quantizing noise.

A more specific circuit construction of the ΔΣ modulator 151 will be described below with reference to FIG. 8.

The integrator 222 is constructed as a switched capacitor circuit operating at a certain clock frequency.

An input portion 230 of the integrator 222 includes MOS switches 231 and 232 each of which is made of a pair of PMOS and NMOS transistors and which are respectively disposed on the input side and the output side of the input portion, and a capacitor 233 is disposed in the middle between the MOS switches 231 and 232. Clock pulses Φck and Φxck of opposite polarity are applied to the PMOS and NMOS transistors of each of the MOS switches 231 and 232.

In this input portion 230, the amount of current to be supplied to an operational amplifier 240 can be controlled by a clock frequency relative to the MOS switches 231 and 232 and the capacitance value of the capacitor 233.

The operational amplifier 240 is of the type used as a general integration circuit provided with a feedback capacitor 241, and generates an integral voltage by controlling the amount of current to flow into the capacitor 241, by means of MOS transistors Tr1 to Tr5, a signal from the input portion 230 and reference voltages Vref1 and Vref2.

In an integrator having a basic construction, a resistor is inserted in place of the input portion 230, but in this example, since the switched capacitor circuit including the input portion 230 and the operational amplifier 240 is used, the errors contained in the respective capacitances of the two capacitors 233 and 241 can be cancelled by appropriately selecting the capacitances of the two capacitors 233 and 241, whereby the relative error of the integrator 222 can be reduced.

The quantizer 223 is a general comparator circuit which is made of a differential amplifier 250 and a D flip-flop 260. The quantizer 223 compares the input signal from the integrator 222 with a reference voltage Vref3, and outputs the comparison result in synchronism with the clock pulse Φckl through the D flip-flop 260.

The 1-bit D/A converter 224 is made of MOS switches 261 and 262 and a capacitor 263 similarly to the D/A converter 230 of the integrator 222, and converts a 1-bit input signal into a predetermined analog signal and feeds the analog signal back to the integrator 222.

Incidentally, in FIG. 7, the junction of the input portion 230 of the integrator 222 and the output of the 1-bit D/A converter 224 corresponds to the adder 221 shown in FIG. 7.

The digital filter 161 will be described below with reference to FIGS. 9 and 10.

There are various digital low-pass filters usable in the invention, but in the following description, reference will be made to an example in which a moving average filter is used.

FIG. 9 schematically shows the construction of a moving average filter.

A moving average filter 270 includes arithmetic units 280 each made of a delay element 281 and an adder 282, and the arithmetic units 280 are connected in series in a multi-stage (M stages) form. The output of the last-stage one of the adders 282 is divided by (M+1) through a digital amplifier 290, and is outputted as a moving average value.

FIG. 10 is a circuit diagram of the first-stage one of the arithmetic units 280 shown in FIG. 9. As shown in FIG. 10, in this arithmetic unit 280, a D flip-flop 281A is used as the delay element 281, and the output of the D flip-flop 281A is inputted to an adder 282A and is added to the output from the previous stage, and the sum is sent to the next stage.

It is to be noted that the first-stage and following arithmetic units 280 have a 1-bit input and hence one D flip-flop 281A, and in the second-stage and following arithmetic units 280, since the number of input bits gradually increases, the number of bits of the adder 282A increases correspondingly.

The circuit operation of the above-described A/D converter will be described below in brief with reference to the timing chart of FIG. 11.

First of all, when the processing of the CDS circuit 141 is completed and the output of the CDS circuit 141 (the input signal of the A/D converter) rises as shown in FIG. 11, the ΔΣ modulator 151 generates a binary compressional wave synchronized with the operating clock pulse Φckl and outputs the binary compressional wave to the moving average filter 270 (the digital filter 161).

The first stage of the moving average filter 270 outputs a signal obtained by delaying the output of the ΔΣ modulator 151 by one clock period, and the second and later stages respectively output signals calculated with different amounts of delay which are increased gradually stage by stage, and finally, a signal obtained by dividing the output of the ΔΣ modulator 151 by (M+1) is outputted.

According to the above-described construction, the ΔΣ modulator 151 and the digital filter 161 can be used to perform highly precise A/D conversion on each pixel signal, and the pixel signals of the respective pixel columns that are outputted from the corresponding A/D converters are combined into a video signal by a circuit disposed at the rear stage of the A/D converters, whereby a digital video signal of good quality can be outputted.

In particular, by using the 1-bit ΔΣ modulators mentioned in this example, it is possible to handle 1-bit signals during A/D conversion. Accordingly, there are the advantages that the accuracy of each bit need not be strictly ensured compared to a method of performing multi-bit (a plurality of bits) operations, and also the advantage that it is possible to realize A/D conversion processing which does not depend on any other analog element.

Incidentally, the use of multi-bit ΔΣ modulators provides the advantages that A/D conversion can be easily made highly precisely and that the stability of ΔΣ modulators increases.

In addition, by increasing a clock speed, it is possible to improve a noise reduction effect, whereby it is possible to provide a solid-state image pickup device resistant to noise.

In addition, this A/D converter including the AI modulator 151 and the digital filter 161 can be used to easily realize variable control of the accuracy of A/D conversion, and has the advantage of being applicable to various uses.

In general A/D converters, it is not necessarily easy to change conversion accuracy (the number of conversion bits). However, in the construction using the above-described ΔΣ modulators 151, it is possible to easily change control of A/D conversion by changing the rate of the clock pulse Φckl. Accordingly, for example, it is possible to realize a construction which can be used in a power-saving mode with a lowered conversion accuracy, or it is possible to simplify image processing, or it is possible to provide image outputs with different accuracies corresponding to the difference in resolution between the recording of a digital image onto a recording medium and the display of an image on a display panel.

For example, it is possible to adopt a construction which has operating means for making selection from various modes for different A/D conversion accuracies so that each of the various modes can be selected by switching the rate of the clock pulse Φckl of the ΔΣ modulator 151 on the basis of the operation of the operating means.

A third embodiment of the invention will be described below.

Figure 12:
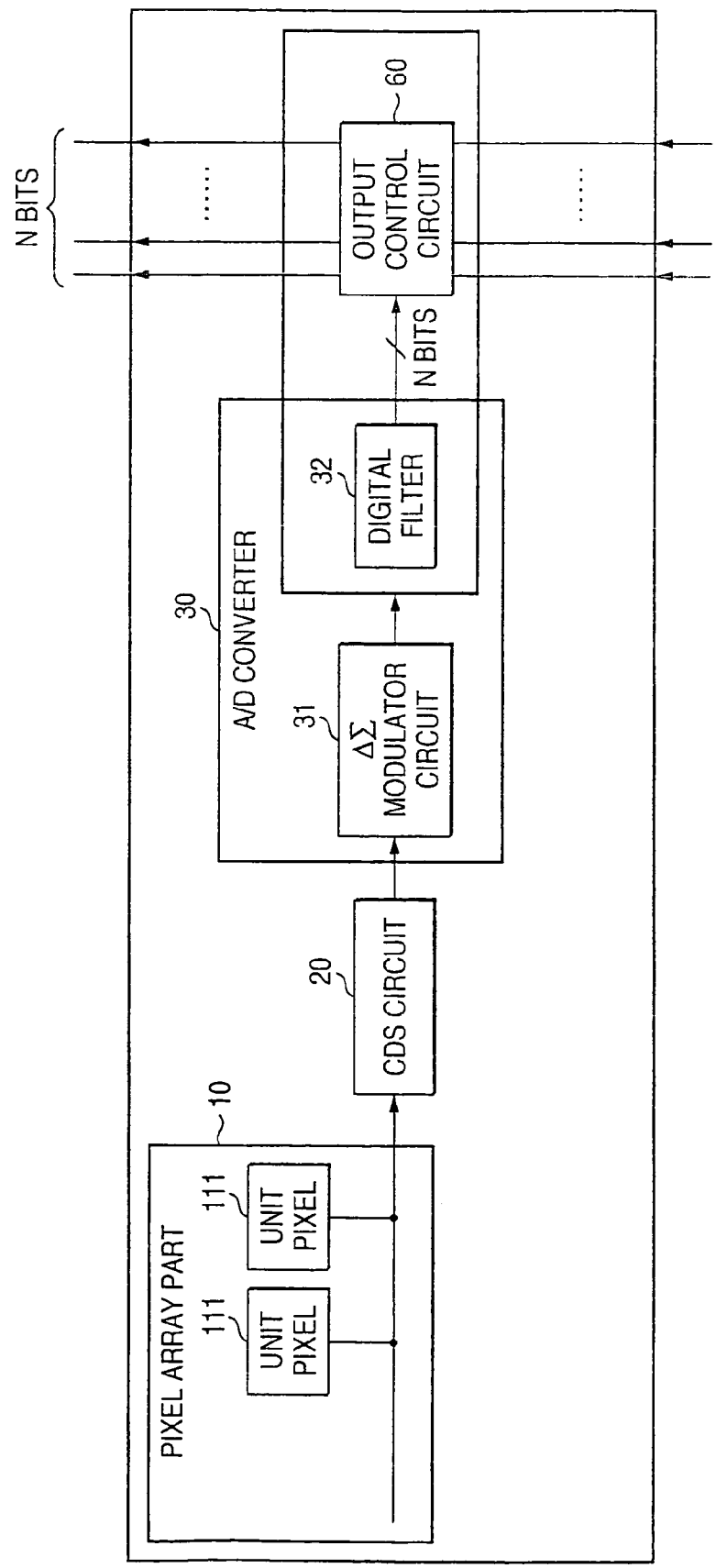
FIG. 12 is a block diagram showing an essential portion of a solid-state image pickup device according to a third embodiment of the invention.

FIG. 12 is a block diagram showing an essential portion of a solid-state image pickup device according to the third embodiment of the invention. In FIG. 12, the same reference numerals are used to denote the same constituent elements as those used in the solid-state image pickup device shown in FIG. 1.

The solid-state image pickup device according to the third embodiment has a construction in which output control circuits 60 for sequentially selecting digital pixel signals converted by the above-described plurality of A/D converters and outputting the sequentially selected digital pixel signals in their line directions are provided at the rear stage of the above-described A/D converter.

The respective output control circuits 60 are circuits for sequentially transferring digital pixel signals outputted from the corresponding digital filters 32 of the A/D converters 30 in the pixel-line directions, and are capable of outputting line data by sequentially transferring one line of pixel signals.

Incidentally, in the example shown in FIG. 12, a digital pixel signal is outputted with a data width of N bits corresponding to, for example, the data width of the digital filter 32. Generally, since a data width of 8 bits is used, the output control circuit 60 is constructed to output a digital pixel signal with 8 signal lines.

The pixel array part 10, the CDS circuit 20 and the A/D converter 30 (the ΔΣ modulator 31 and the digital filter 32) are similar to the corresponding ones of the example shown in FIG. 1.

In addition, the construction shown in FIG. 12 can also be modified so that the CDS circuit 20 is disposed at the rear stage of the output control circuit 60 similarly to the example shown in FIG. 2.

Figure 13:
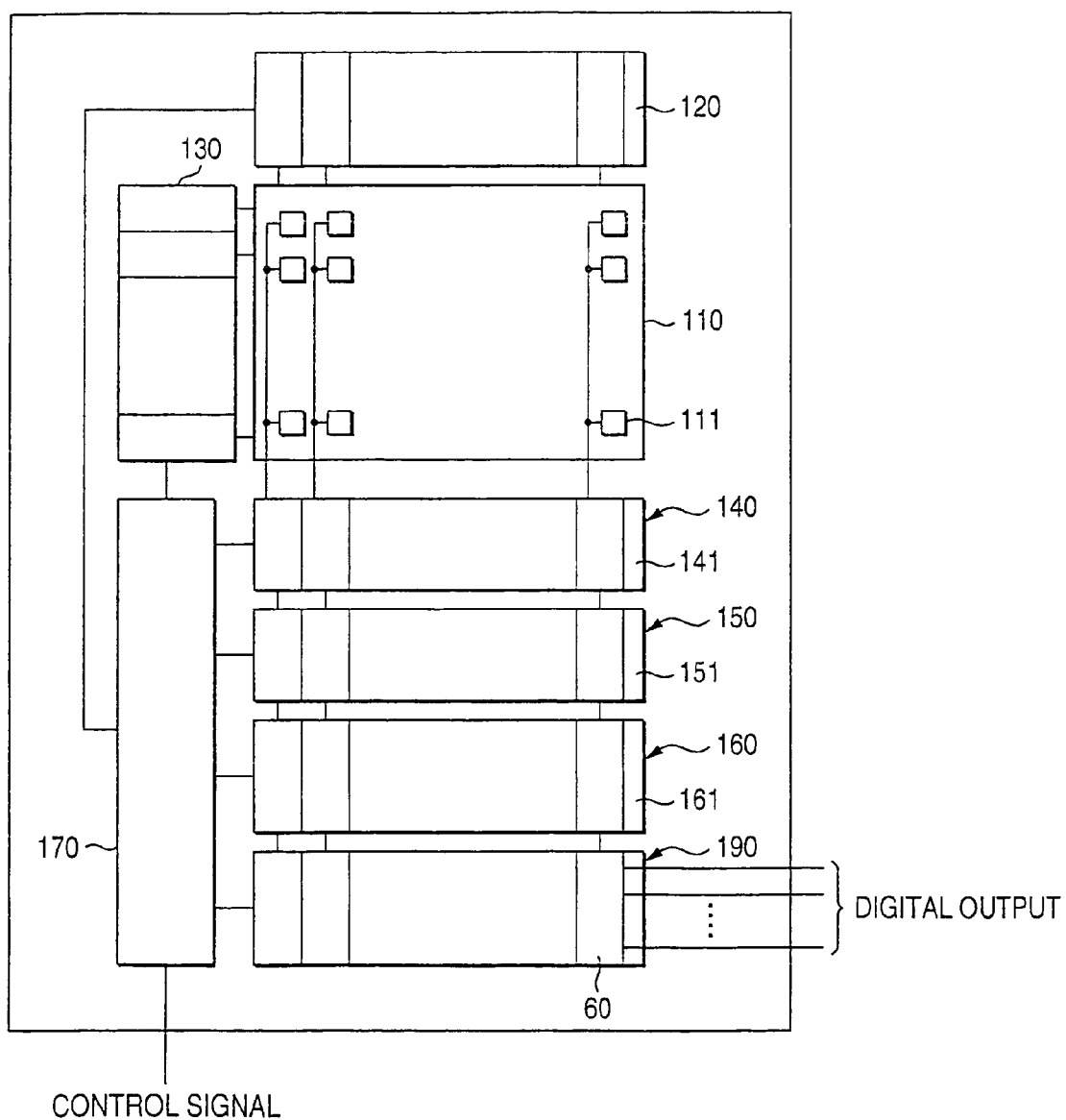
FIG. 13 is a schematic explanatory view showing the entire construction of an image array part and peripheral circuit parts of the solid-state image pickup device according to the embodiment shown in FIG. 12.

FIG. 13 is a schematic explanatory view showing the entire construction of an image array part and peripheral circuit parts of the solid-state image pickup device according to the third embodiment. In FIG. 13, the same reference numerals are used to denote the same constituent elements as those used in the solid-state image pickup device shown in FIG. 3.

As shown in FIG. 13, this solid-state image pickup device includes the output control part 190 having the output control circuits 60 disposed for the respective pixel lines, and the output control part 190 is disposed at the rear stage (the output side) of the digital filter part 160 of the A/D conversion part and is constructed to receive data in units of pixel lines from the digital filter part 160 and transferring and outputting the received data in the pixel-line direction. Incidentally, since the other constituent elements are the same as those shown in FIG. 3, the description thereof is omitted.

Figure 14:
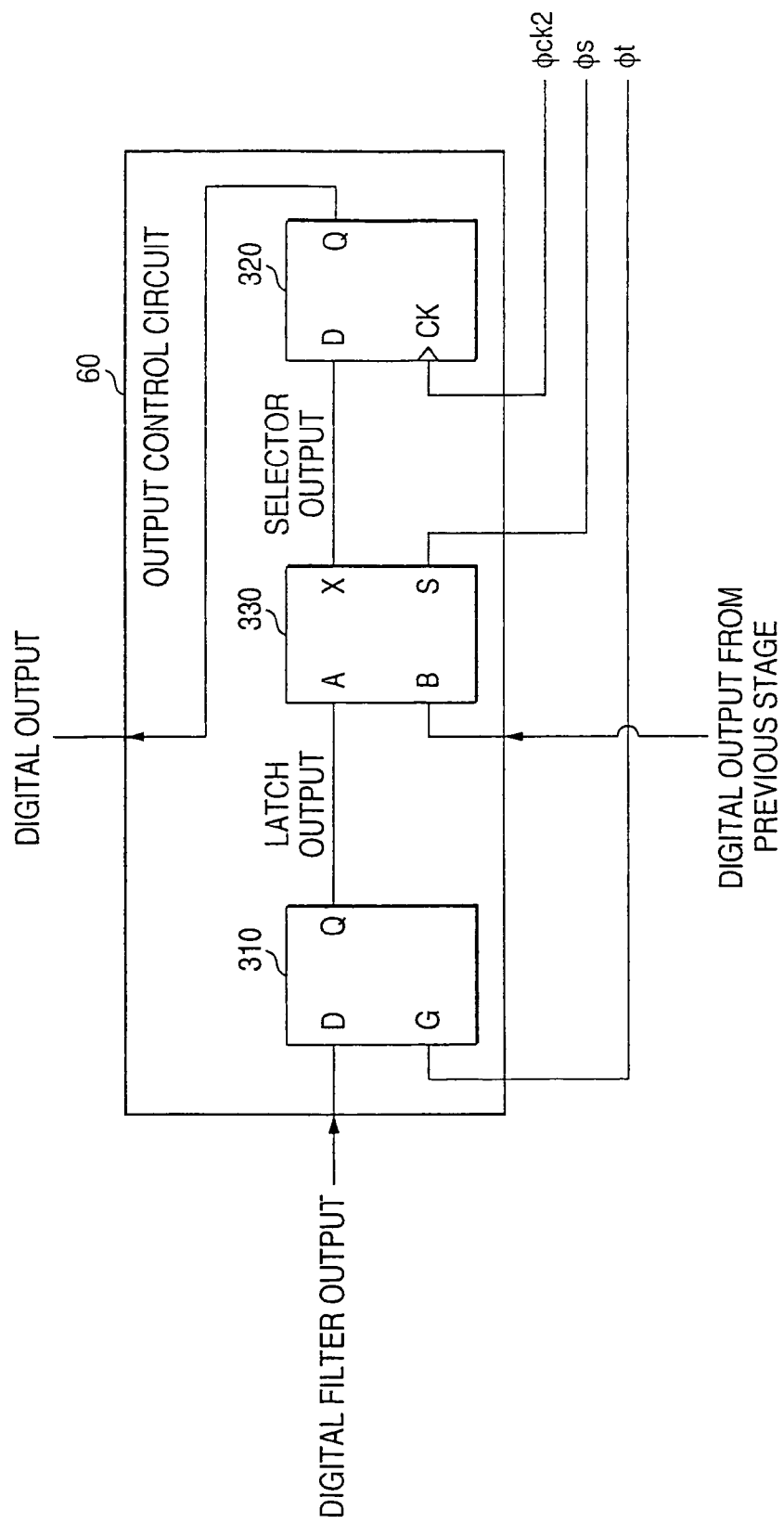
FIG. 14 is a block diagram showing an example of the construction of an output control circuit of the solid-state image pickup device according to the embodiment shown in FIG. 12.

FIG. 14 is a block diagram showing an example of the construction of one of the output control circuits 60.

The shown output control circuit 60 has a latch circuit 310 for temporarily storing the output data from the corresponding one of the digital filters 32, a latch circuit 320 which constitutes a shift register, and a selector circuit 330 for selecting data to be stored into the latch circuit 320.

Namely, the output of the latch circuit 310 in the output control circuit 60 in which the selector circuit 330 is provided is connected to one input terminal (a terminal A) of the selector circuit 330, and the shift-register-side output of the latch circuit 320 which is provided in the output control circuit 60 disposed in the immediately previous column is connected to the other input terminal (a terminal B) of the selector circuit 330.

The output of the latch circuit 320 is connected to the other input terminal (the terminal B) of the selector circuit 330 which is provided in the output control circuit 60 disposed in the next column.

Each of the latch circuits 310 and 320 is made of a D flip-flop.

Figure 15:
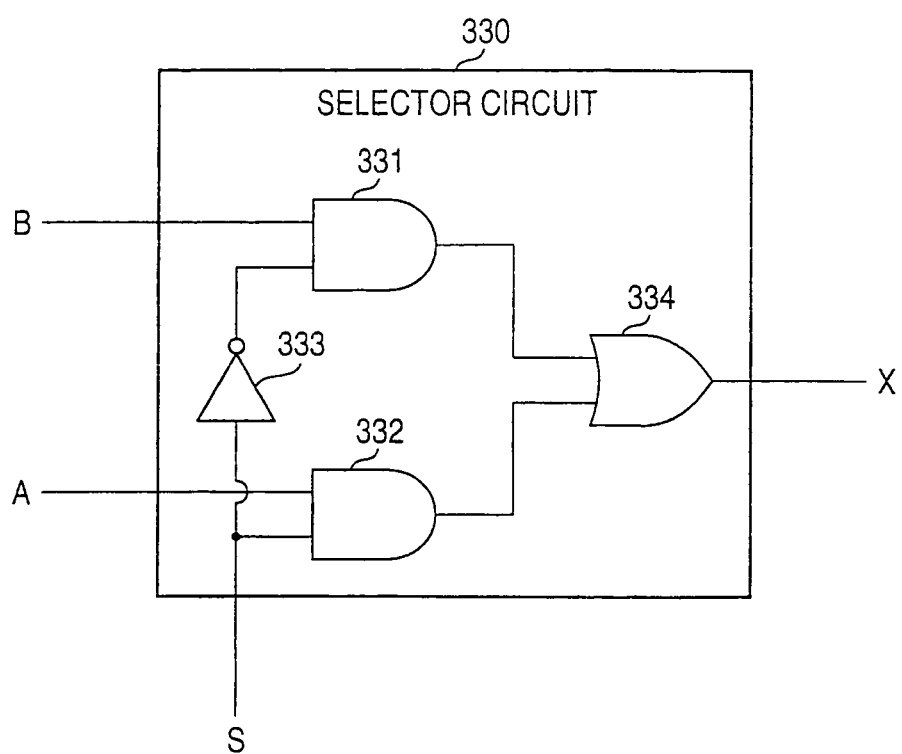
FIG. 15 is a block diagram showing an example of the construction of a selector circuit of the solid-state image pickup device according to the embodiment shown in FIG. 12.

FIG. 15 is a block diagram showing an example of the construction of the selector circuit 330.

As shown, the selector circuit 330 can be formed by simple logic circuits such as AND circuits 331 and 332, an inverter circuit 333 and an OR circuit 334.

In the output control circuit 60, a first step of operation is the operation of storing the output data from the digital filter 32 into the latch circuit 310. A second step of operation is the operation of storing the data stored in the latch circuit 310 into the latch circuit 320 through the selector circuit 330.

A third step of operation is the shift-register operation of transferring the data stored in the latch circuit 320 in the direction of the column in which the latch circuit 320 is disposed.

Namely, in the second step of operation, the selector circuit 330 selects and writes the data of the latch circuit 310 into the latch circuit 320, and in the third step of operation, the selector circuit 330 selects the data of the latch circuit 320 provided in the output control circuit 60 disposed in the immediately previous column and writes the selected data into the latch circuit 320. Then, the third step of operation is repeatedly performed on the basis of shift clock pulses, thereby sequentially shifting the data stored in the shift-register side of each of the latch circuits 320 in the pixel-line direction and outputting the data as a serial signal.

Incidentally, the construction shown in FIG. 14 corresponds to a data width of 1 bit, and in the case where the construction is made to handle the data width (N bits) of the digital filter 161 as described above, a plurality of N-bit output control circuits 60 are disposed in parallel in the pixel-line direction so that each of the N-bit output control circuits 60 can perform a shift operation in parallel to output data of N-bit width in a serial form.

In addition, as described above, in the construction provided with an output control part 190, a reduction in power consumption or the like can be achieved by using power sources having different levels of sources voltages on its analog side and on its digital side, respectively.

Specifically, the source voltage for the digital filter parts 160 and the output control part 190 on the digital side is made lower than the source voltage for the image array part 110, the CDS parts 140 and the $\Delta\Sigma$ modulator parts 150.

Specifically, the source voltage on the analog side can be made 2.5 V, and the source voltage on the digital side can be made 1.8 V.

In the case where the CDS circuit 141 is disposed at the rear stage of the digital filter part 160, the lower source voltage on the digital side can also be used for the CDS circuit 141.

As a method using such two kinds of source voltages, it is possible to use a method of providing two kinds of external power source inputs on a solid-state image pickup device and supplying two kinds of power sources from the outside, or a method of externally supplying a source voltage for analog processing, stepping down or up the source voltage in a solid-state image pickup device, and generating a source voltage for digital processing.

Figure 16:
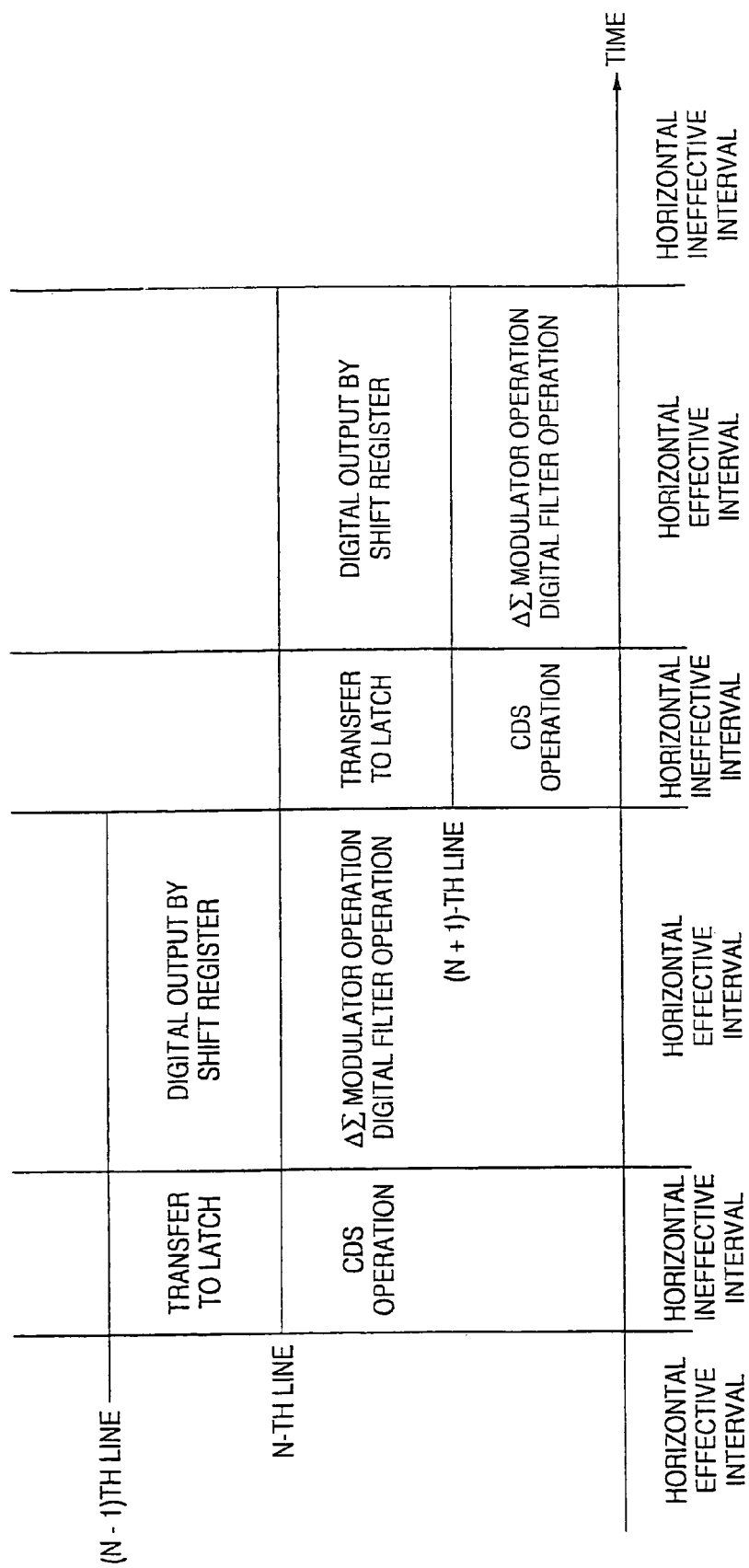
FIG. 16 is a timing chart showing the entire operation of the solid-state image pickup device according to the embodiment shown in FIG. 12.

FIG. 16 is a timing chart showing the entire operation of the solid-state image pickup device according to the third embodiment.

As can be seen from a comparison of FIG. 16 and FIG. 4, in the third embodiment, after the above-described operation of the CDS circuit 141 and the A/D converter (the $\Delta\Sigma$ modulators 151 and the digital filters 161) disposed in the n-th line, the data from the A/D converter is read into the latch circuits 310 and 320 during the above-described horizontal ineffective interval, and during the next horizontal effective interval, the data is transferred through the shift register (the latch circuit 320).

As a matter of course, the operation of the output control part 190 (the output control circuit 60) is processed in parallel with the operation of the CDS circuit 141 and the A/D converter (the $\Delta\Sigma$ modulators 151 and the digital filters 161) which are disposed in the next line owing to the disposition of this output control part 190, it is possible to achieve various advantages; for example, it is possible to reduce the number of lines required to output an image signal to the rear stage and the number of connection pads for external output, and in the case where a video signal is generated by a rear-stage generating circuit on the basis of an image signal read from the pixel array part, a signal of appropriate bit width can be supplied to the generating circuit.

A fourth embodiment of the invention will be described below.

In the above-described $\Delta\Sigma$ modulator 151 shown in FIGS. 7 and 8, the 1-bit D/A converter 224 is provided in the feedback loop so that a fixed value is fed back, and the gain of the $\Delta\Sigma$ modulator 151 is fixed. However, if the gain can be adjusted in the case of, for example, an image pickup operation in a dark environment, it is possible to construct a solid-state image pickup device having far higher added values.

Therefore, the fourth embodiment is intended to provide a construction which enables the amount of feedback to be varied as required so that its gain can be increased.

FIG. 17 is a block diagram showing an example of the construction of the $\Delta\Sigma$ modulator 151 of the fourth embodiment. In this construction, the 1-bit D/A converter 224 shown in FIG. 8 is modified, and since the other constituent elements are the same as those shown in FIG. 3, the description thereof is omitted.

In a 1-bit D/A converter 224A of the fourth embodiment, a MOS switch 261A and a capacitor, 263A which are provided on the side of the integrator 222 are common to the MOS switch 261 and the capacitor 263 of the above-described 1-bit D/A converter 224, but two MOS switches 264 and 265 are provided on the side of the quantizer 223.

The MOS switch 264 is connected to a variable voltage source 266, and is opened and closed to disconnect and connect this variable voltage source 266 and the feedback loop.

The MOS switch 265 is connected to a ground voltage GND, and is opened and closed to disconnect and connect the ground voltage GND and the feedback loop.

The MOS switch 264 is switched by a signal obtained by ANDing the clock pulses $\Phi$ckl and $\Phi$xckl of opposite polarity and an output cont of the quantizer 223, while the MOS switch 265 is switched by a signal obtained by ANDing the clock pulses $\Phi$ckl and $\Phi$xckl of opposite polarity and an inverted signal /cont. If the output cont is "1", the MOS switch 264 is switched on and the voltage from the variable voltage source 266 is supplied to the feedback loop, whereas if the output cont is "0", the MOS switch 265 is switched on and the voltage from the ground voltage GND is supplied to the feedback loop.

Accordingly, by variably adjusting the source voltage of the variable voltage source 266, it is possible to control the amount of signals to be fed back, thereby adjusting the gain.

It is to be noted that the construction capable of determining the required amount of gain can be applied to, for example, a method of making a decision as to ambient brightness on the basis of a tentatively picked-up image and determining an amount of gain corresponding to the result of the decision.

A fifth embodiment of the invention will be described below.

In each of the above-described embodiments, the pixel array part is constructed in such a manner that each of the A/D converters (the $\Delta\Sigma$ modulators 151 and the digital filters 161) is provided for each one of the pixel columns, but it is also possible to realize a simple construction or a reduced installation space, for example by providing either or both of the $\Delta\Sigma$ modulator 151 and the digital filter 161 for a plurality of adjacent pixel columns. For example, as shown in FIG. 18A, two pixel columns (columns A and B) may be sequentially connected to one set of the $\Delta\Sigma$ modulator 151 and the digital filter 161 via a switch 240 so that A/D conversion processing is performed.

Figure 18A:
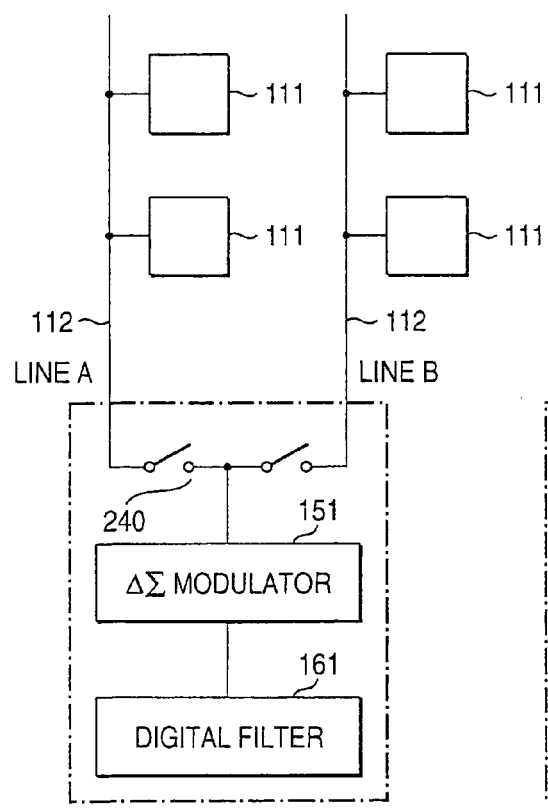
FIGS. 18A and 18B are block diagrams showing an essential portion of a solid-state image pickup device according to a fifth embodiment of the invention.
Figure 18B:
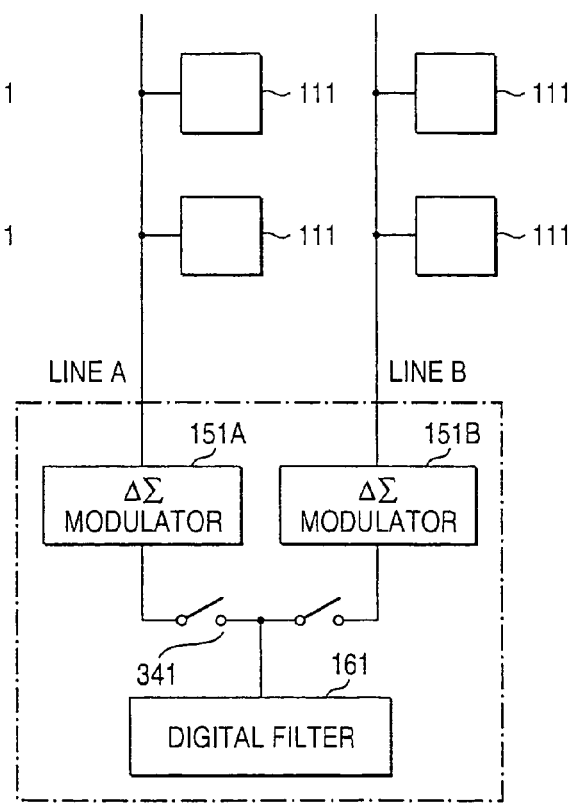

As shown in FIG. 18B, two pixel columns (columns A and B) may also be respectively connected to individual AI modulators 151A and 151B so that processing is performed on each of pixel signals inputted from the two pixels columns, and the outputs of the $\Delta\Sigma$ modulators 151A and 151B may be sequentially connected to one digital filter, 161 via a switch 341 so that filter processing is performed on each of the output signals from the $\Delta\Sigma$ modulators 151A and 151B.

Figure 19:
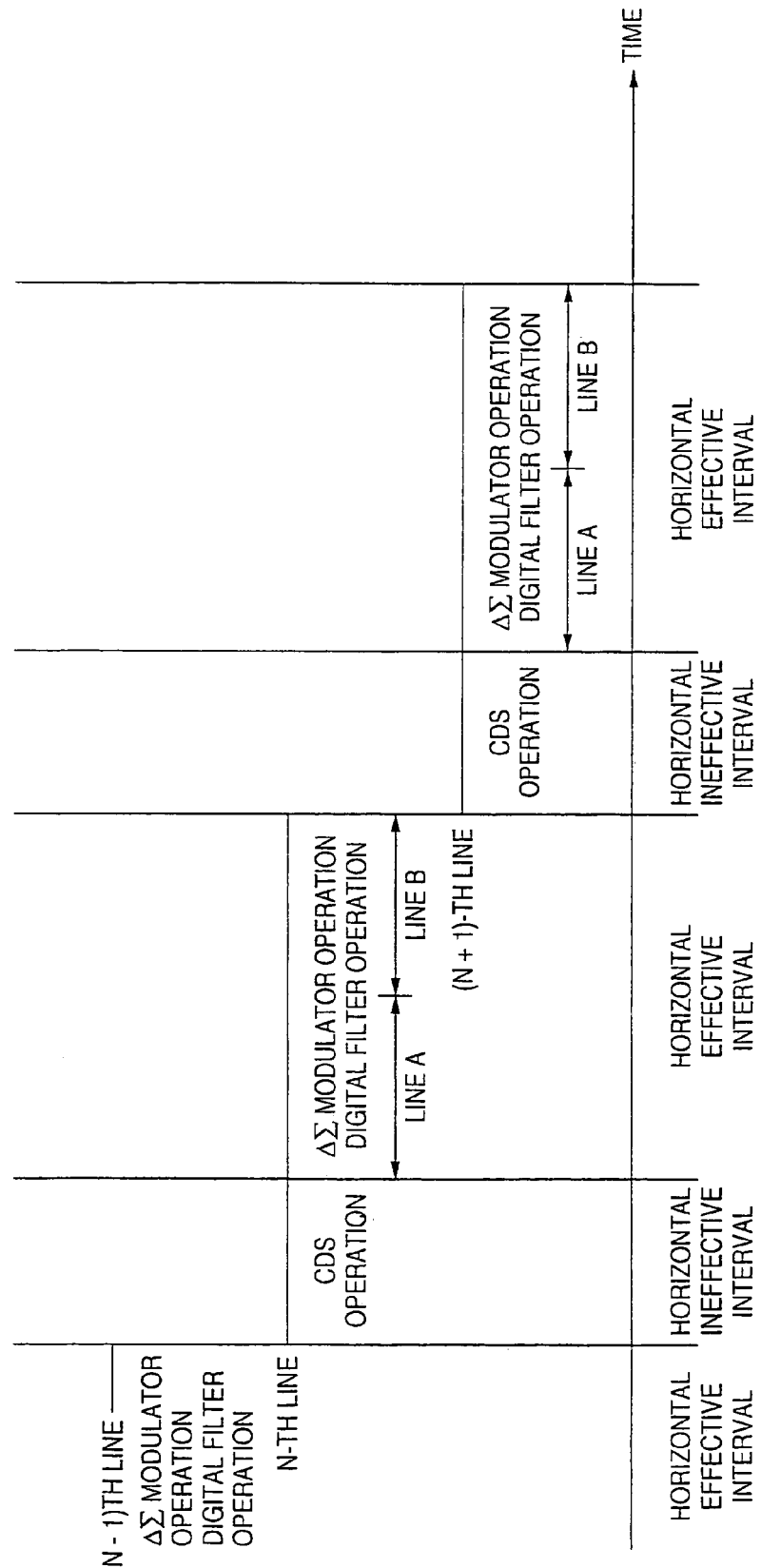
FIG. 19 is a timing chart showing an example of the operation of the example shown in FIGS. 18A and 18B.

FIG. 19 is a timing chart showing the operation of the example shown in FIG. 18A.

As shown in FIG. 19, during the horizontal effective interval in which the ΔΣ modulator 151 and the digital filter 161 are in operation, the columns A and B are sequentially processed.

A sixth embodiment of the invention will be described below.

In the feedback of the above-described ΔΣ modulator 151, when the processing of a plurality of pixel signals is continuously performed, because of the characteristics of the feedback loop, signal components left in the feedback loop during the processing of the previous pixel signal influence the processing of the next pixel signal, resulting in the risk of incurring image degradation such as color mixture.

Therefore, the sixth embodiment of the invention adopts a method of, on the completion of the processing of the previous pixel signal (the previous pixel line), resetting the feedback loop of the ΔΣ modulator 151 by an arbitrary method and also delaying the transfer of a signal from the CDS circuit (or from the pixel array part in the case where the CDS circuit is disposed at the rear stage of the ΔΣ modulator 151) by a predetermined period of time.

FIGS. 20A and 20B are timing charts of the outline of this reset operation.

As shown in FIG. 20A, in the sixth embodiment, a reset pulse Φreset for the ΔΣ modulator 151 is provided, and the resetting of the ΔΣ modulator 151 is performed in synchronism with a CDS output operation. As shown in FIG. 20B, this reset operation is performed together with the CDS output operation during the horizontal ineffective interval.

Figure 21:
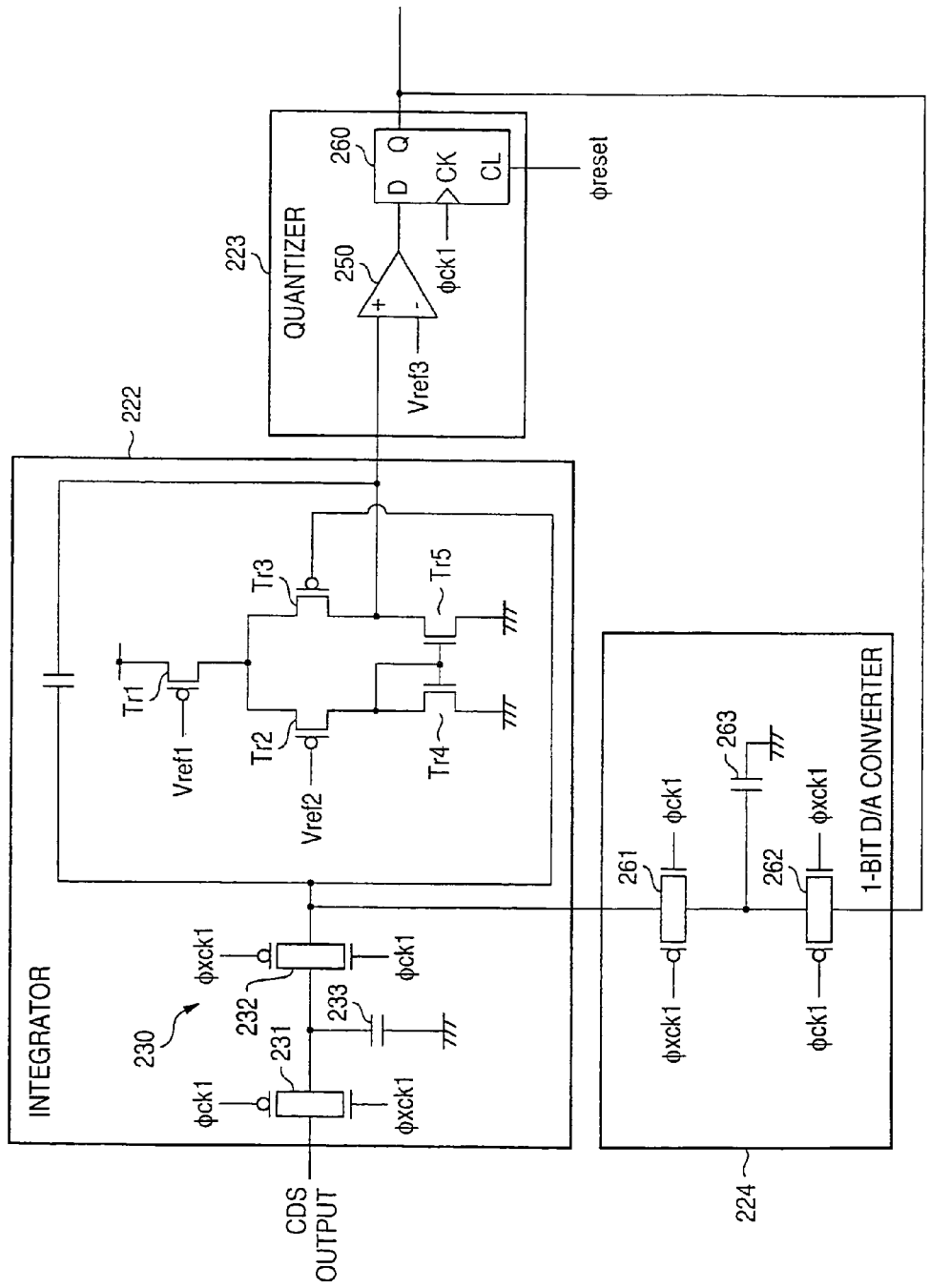
FIG. 21 is a block diagram showing a first example of the construction of a $\Delta\Sigma$ modulator according to the sixth embodiment of the invention.

As a specific method of resetting the ΔΣ modulator 151, it is possible to use a method of inputting the reset pulse Φreset to a clear terminal CL of the D flip-flop 260 of the quantizer 223 and forcedly resetting the output of the quantizer 223, as shown in FIG. 21.

Figure 22:
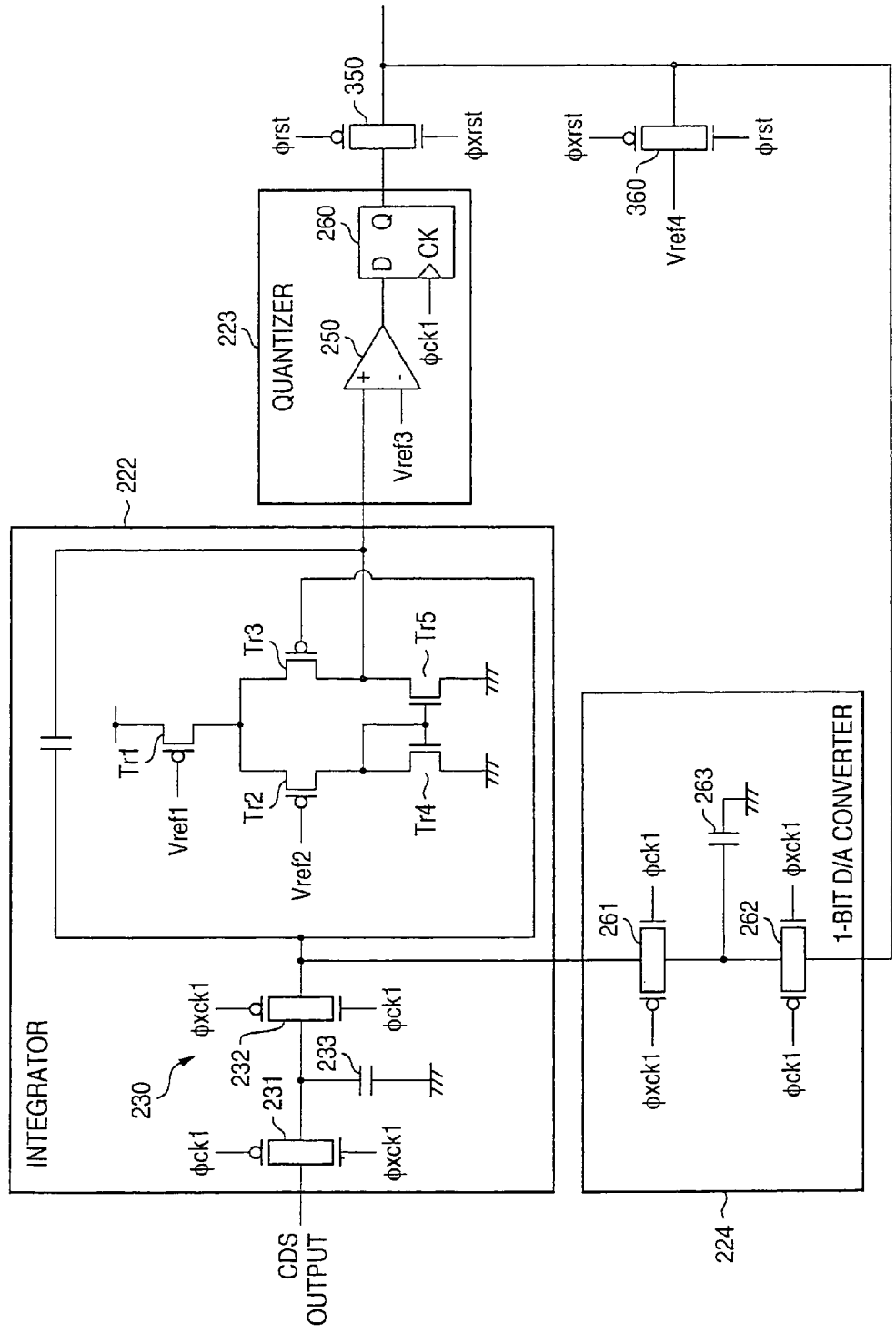
FIG. 22 is a block diagram showing a second example of the construction of a $\Delta\Sigma$ modulator according to the sixth embodiment of the invention.
Figure 23:
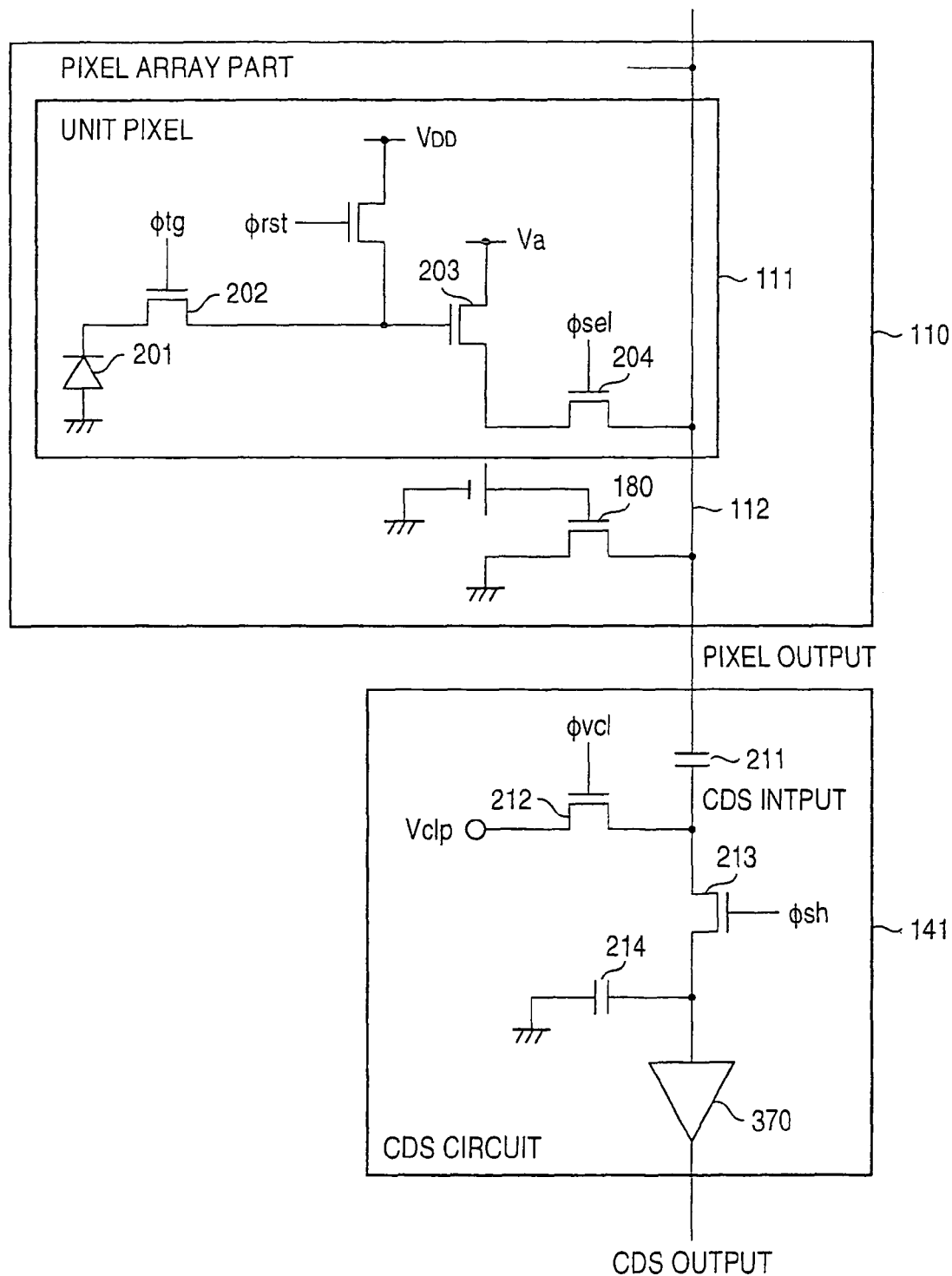
FIG. 23 is a block diagram showing an example of the construction of a CDS circuit according to the sixth embodiment of the invention.

Otherwise, it is possible to use a method in which, as shown in FIG. 22, a MOS switch 350 for forcedly cutting off such a solid-state image pickup device, such as a camera apparatus or a mobile terminal device, whereby it is possible to realize advantages such as an improvement in image quality and a saving of power consumption. Accordingly, such electronic equipment is also included within the scope of the invention.

As is apparent from the foregoing description, in accordance with a solid-state image pickup device and a signal processing method therefor according to the invention, ΔΣ modulators and digital filters are used for the A/D conversion of converting analog pixel signals outputted from the pixel columns or the pixel lines of a pixel array part into digital pixel signals, whereby it is possible to perform highly accurate and highly reliable A/D conversion on the analog pixel signals by making the most of the characteristics of the ΔΣ modulators. Accordingly, it is possible to achieve a reduction in power consumption and reductions in the size and the price of the device as well as simplification of the construction of the device, and it is also possible to realize a high-quality image output.

What is claimed is:

1. A solid-state image pickup device comprising:
a pixel array part in which a plurality of pixels each including a photoelectric conversion element are arrayed in a one-dimensional direction or in two-dimensional directions;
signal processing parts for performing predetermined signal processing on pixel signals outputted from the pixels, each of the signal processing parts having an A/D converter for converting an analog signal into a digital signal; and
a clock control unit for changing a conversion accuracy of the A/D converter by changing a clock of a ΔΣ modulator, the A/D converter including at least a modulator,
wherein the modulator is the ΔΣ modulator, and the A/D converter further includes a digital filter; and
wherein the ΔΣ modulator has an integrator using a switched capacitor circuit made of a plurality of PMOS and NMOS switches, a capacitor and an operational amplifier.

2. A signal processing method for a solid-state image pickup device, comprising an A/D conversion step of converting an analog pixel signal outputted from a pixel into a digital pixel signal,
the A/D conversion step using a modulator and a digital filter, and
wherein the modulator is a ΔΣ modulator, an integrator of the ΔΣ modulator using a switched capacitor circuit made of a plurality of PMOS and NMOS switches, a capacitor and an operational amplifier,
wherein the modulator is a ΔΣ modulator and the signal processing method further comprises a clock control step of changing a conversion accuracy of the A/D conversion step by changing a clock of the ΔΣ modulator.

3. An electronic apparatus comprising a solid-stage image pickup device,
the solid-state image pickup device including:
a pixel array part in which a plurality of pixels each including a photoelectric conversion element are arrayed in a one-dimensional direction or in two-dimensional directions;
signal processing parts for performing predetermined signal processing on pixel signals outputted from the pixels, each of the signal processing parts having an A/D converter for converting an analog signal into a digital signal; and
a clock control unit for changing a conversion accuracy of the A/D converter by changing a clock of a ΔΣ modulator the A/D converter including at least a modulator,
wherein the modulator is the ΔΣ modulator, and the A/D converter further includes a digital filter, and
wherein the ΔΣ modulator has an integrator using a switched capacitor circuit made of a plurality of PMOS and NMOS switches, a capacitor and an operational amplifier.

* * * * *